(12) United States Patent
Smith et al.

(10) Patent No.: US 12,458,942 B2
(45) Date of Patent: *Nov. 4, 2025

(54) CAPSULES

(71) Applicant: The Procter & Gamble Company, Cincinnati, OH (US)

(72) Inventors: Steven Daryl Smith, Fairfield, OH (US); Valerie Wong, Mason, OH (US); Roland Vanderstraeten, Brussels (BE); Andre Martim Barros, Woluwe Saint Etienne (BE); Mariana B T Cardoso, Ixelles (BE); Pierre Daniel Verstraete, Lambert (BE)

(73) Assignee: The Procter & Gamble Company, Cincinnati, OH (US)

( * ) Notice: Subject to any disclaimer, the term of this patent is extended or adjusted under 35 U.S.C. 154(b) by 873 days.

This patent is subject to a terminal disclaimer.

(21) Appl. No.: 17/498,016

(22) Filed: Oct. 11, 2021

(65) Prior Publication Data

US 2022/0118417 A1    Apr. 21, 2022

Related U.S. Application Data

(60) Provisional application No. 63/092,618, filed on Oct. 16, 2020.

(51) Int. Cl.
*B01J 13/16* (2006.01)
*A61K 8/11* (2006.01)
*A61Q 13/00* (2006.01)

(52) U.S. Cl.
CPC ............. *B01J 13/16* (2013.01); *A61K 8/11* (2013.01); *A61Q 13/00* (2013.01)

(58) Field of Classification Search
CPC ....................................................... B01J 13/16
See application file for complete search history.

(56) References Cited

U.S. PATENT DOCUMENTS

| | | |
|---|---|---|
| 5,500,223 A | 3/1996 | Behan et al. |
| 6,243,909 B1 | 6/2001 | Graham et al. |
| 6,537,583 B1 | 3/2003 | Dupuis et al. |
| 8,425,940 B2 | 4/2013 | Lapidot et al. |
| 8,931,971 B2 | 1/2015 | Schwarz et al. |
| 9,603,784 B2 | 3/2017 | Shimizu et al. |
| 10,046,291 B2 | 8/2018 | Yamazaki |
| 10,285,928 B2 | 5/2019 | Marsh et al. |
| 10,653,286 B2 | 5/2020 | Mirle et al. |

(Continued)

FOREIGN PATENT DOCUMENTS

| | | |
|---|---|---|
| CA | 2980792 A1 | 2/2010 |
| CN | 103432970 A | 12/2013 |

(Continued)

OTHER PUBLICATIONS

All Office Actions; U.S. Appl. No. 18/581,755, filed Feb. 20, 2024.

(Continued)

*Primary Examiner* — Liam J Heincer
(74) *Attorney, Agent, or Firm* — Kathleen Y. Carter; James E. Oehlenschlager

(57) ABSTRACT

A population of capsules, the capsules can include a core including a benefit agent and a shell surrounding the core, wherein the shell can include a first shell component.

19 Claims, 17 Drawing Sheets

(56) References Cited

U.S. PATENT DOCUMENTS

| | | | |
|---|---|---|---|
| 11,446,627 B2* | 9/2022 | Cardoso | A61K 9/501 |
| 11,904,287 B2 | 2/2024 | Cardoso et al. | |
| 11,912,961 B2 | 2/2024 | Barros | |
| 11,938,349 B2 | 3/2024 | Cetti | |
| 12,077,728 B2 | 9/2024 | Barros | |
| 2004/0163674 A1 | 8/2004 | Policicchio et al. | |
| 2005/0158369 A1 | 7/2005 | Dorschner et al. | |
| 2006/0188551 A1 | 8/2006 | Hauser et al. | |
| 2007/0082033 A1 | 4/2007 | Doerschner et al. | |
| 2008/0096780 A1 | 4/2008 | Veugelers et al. | |
| 2009/0247449 A1 | 10/2009 | Burdis | |
| 2010/0143422 A1 | 6/2010 | Popplewell et al. | |
| 2010/0247660 A1 | 9/2010 | Lei et al. | |
| 2011/0094416 A1* | 4/2011 | Kawai | C09C 3/12 204/157.43 |
| 2011/0104221 A1 | 5/2011 | Galeone et al. | |
| 2011/0118161 A1 | 5/2011 | Looft | |
| 2011/0152159 A1 | 6/2011 | Labeque | |
| 2011/0177951 A1* | 7/2011 | Toledano | A61P 31/04 424/451 |
| 2011/0268778 A1 | 11/2011 | Dihora | |
| 2012/0104639 A1 | 5/2012 | Traynor et al. | |
| 2012/0128747 A1 | 5/2012 | Veronique et al. | |
| 2012/0202695 A1 | 8/2012 | Toledano | |
| 2012/0237578 A1 | 9/2012 | Lei | |
| 2012/0256336 A1* | 10/2012 | Yano | C01B 33/18 977/773 |
| 2013/0040817 A1 | 2/2013 | Dreher | |
| 2014/0044761 A1 | 2/2014 | Lei et al. | |
| 2014/0331414 A1* | 11/2014 | Bone | B01J 13/14 510/276 |
| 2014/0338134 A1 | 11/2014 | Fernandez et al. | |
| 2014/0342972 A1 | 11/2014 | Smets | |
| 2016/0168509 A1 | 6/2016 | Hitchcock | |
| 2016/0168510 A1 | 6/2016 | Tasker et al. | |
| 2016/0168511 A1 | 6/2016 | Hitchcock et al. | |
| 2016/0184196 A1 | 6/2016 | Baxter et al. | |
| 2016/0303531 A1* | 10/2016 | Yamazaki | A61Q 13/00 |
| 2016/0317993 A1 | 11/2016 | Rotello et al. | |
| 2017/0073237 A1* | 3/2017 | Lim | C09D 7/70 |
| 2017/0349865 A1 | 12/2017 | Zerhusen et al. | |
| 2018/0085291 A1 | 3/2018 | Sasaki | |
| 2018/0207451 A1 | 7/2018 | Toledano | |
| 2018/0339176 A1* | 11/2018 | Toledano | A61K 8/27 |
| 2019/0143266 A1 | 5/2019 | Dale | |
| 2020/0114328 A1 | 4/2020 | Jerri et al. | |
| 2020/0129947 A1* | 4/2020 | Ouali | B01J 13/16 |
| 2020/0170382 A1 | 6/2020 | Oyama et al. | |
| 2020/0255776 A1 | 8/2020 | Schmiedel et al. | |
| 2020/0306197 A1* | 10/2020 | Brahms | A61K 9/4816 |
| 2020/0330948 A1* | 10/2020 | Cardoso | B01J 13/22 |
| 2020/0330949 A1* | 10/2020 | Cardoso | C11B 9/00 |
| 2020/0330950 A1* | 10/2020 | Cardoso | A61K 8/26 |
| 2022/0118287 A1* | 4/2022 | Cetti | A61K 8/29 |
| 2022/0119741 A1 | 4/2022 | Smets et al. | |
| 2022/0119742 A1 | 4/2022 | Smets et al. | |
| 2022/0119743 A1* | 4/2022 | Barros | C11D 3/3738 |
| 2022/0119745 A1* | 4/2022 | Barros | C11D 17/043 |
| 2024/0060003 A1* | 2/2024 | Lynch | C11D 17/0039 |
| 2024/0060012 A1* | 2/2024 | Lynch | C11D 3/124 |

FOREIGN PATENT DOCUMENTS

| | | |
|---|---|---|
| CN | 105612248 A | 5/2016 |
| CN | 105734540 A | 7/2016 |
| CN | 107001979 A | 8/2017 |
| CN | 107249545 B | 5/2021 |
| EP | 1767613 A1 | 3/2007 |
| EP | 1767614 A1 | 3/2007 |
| EP | 2078696 A1 | 7/2009 |
| EP | 3181674 A1 | 6/2017 |
| EP | 2865423 B1 | 3/2020 |
| JP | 2010209132 A | 9/2010 |
| JP | 2010215806 A | 9/2010 |
| JP | 2012207067 A | 10/2012 |
| WO | 0145615 A1 | 6/2001 |
| WO | 2005044220 A1 | 5/2005 |
| WO | 2007019201 A1 | 2/2007 |
| WO | 2009106318 A2 | 9/2009 |
| WO | 2011154421 A1 | 12/2011 |
| WO | 2013078551 A1 | 6/2013 |
| WO | 2013083760 A2 | 6/2013 |
| WO | 2013174921 A1 | 11/2013 |
| WO | 2016100477 A1 | 6/2016 |
| WO | 2016100479 A1 | 6/2016 |
| WO | 2017016636 A1 | 2/2017 |
| WO | 2017075074 A1 | 5/2017 |
| WO | 2018189588 A1 | 10/2018 |
| WO | 2018231886 A1 | 12/2018 |
| WO | 2019108713 A1 | 6/2019 |
| WO | 2019108718 A1 | 6/2019 |
| WO | 2020077451 A1 | 4/2020 |
| WO | 2020214876 A1 | 10/2020 |
| WO | 2020214877 A1 | 10/2020 |
| WO | 2020214878 A1 | 10/2020 |

OTHER PUBLICATIONS

U.S. Unpublished U.S. Appl. No. 18/581,755, filed Feb. 20, 2024, to Jonathan Robert Cetti et. al.
All Office Actions; U.S. Appl. No. 17/727,857, filed Apr. 25, 2022.
U.S. Unpublished U.S. Appl. No. 17/727,857, filed Apr. 25, 2022, to Mariana B T Cardoso et al.
U.S. Unpublished U.S. Appl. No. 17/500,984, filed Sep. 14, 2021, to Jonathan Robert Cetti et al.
All Office Actions; U.S. Appl. No. 16/851,176, filed Apr. 17, 2020.
All Office Actions; U.S. Appl. No. 16/851,194, filed Apr. 17, 2020.
All Office Actions; U.S. Appl. No. 16/851,173, filed Apr. 17, 2020.
All Office Actions; U.S. Appl. No. 17/500,970, filed Oct. 14, 2021.
All Office Actions; U.S. Appl. No. 17/500,979, filed Oct. 14, 2021.
All Office Actions; U.S. Appl. No. 17/500,984, filed Oct. 14, 2021.
All Office Actions; U.S. Appl. No. 17/501,202, filed Oct. 14, 2021.
Jyothi et al, "Microencapsulation techniques, factors influencing encapsulation efficiency", Journal of Microencapsulation, 27:3, pp. 187-197.
Liu, M.: "Understanding the mechanical strength of microcapsules and their adhesion on fabric surfaces",2010, University of Birmingham,XP055511234, cited in the application pp. 86-89 p. 104-p. 106 p. 118.
Thompson et al., "Colloidosomes: Synthesis, properties and applications", Journal of Colloid and Interface Science, 447, 2015, pp. 217-228.
U.S. Unpublished U.S. Appl. No. 17/500,970, filed Oct. 14, 2021, to Andre Martim Barros et. al.
U.S. Unpublished U.S. Appl. No. 17/500,979, filed Oct. 14, 2021, to Andre Martim Barros et. al.
U.S. Unpublished U.S. Appl. No. 17/501,202, filed Oct. 14, 2021, to Andre Martim Barros et. al.
All Office Actions; U.S. Appl. No. 18/115,890, filed Mar. 1, 2023.
U.S. Unpublished U.S. Appl. No. 18/115,890, filed Mar. 1, 2023, to Mariana B T Cardoso et. al.
All Office Actions; U.S. Appl. No. 18/410,116, filed Jan. 11, 2024.
All Office Actions; U.S. Appl. No. 18/418,649, filed Jan. 22, 2024.
U.S. Unpublished U.S. Appl. No. 18/410,116, filed Jan. 11, 2024, to Mariana B. T. Cardoso et al.
U.S. Unpublished U.S. Appl. No. 18/418,649, filed Jan. 22, 2024, to Andre Martim Barros et al.
All Office Actions: U.S. Appl. No. 18/894,382, filed Sep. 24, 2024.
U.S. Unpublished U.S. Appl. No. 18/894,382, filed Sep. 24, 2024, Andre Martim Barros et al.
Merriam-Websters Dictionary Online, Retrieved from Internet: https://www.merriam-webster.com/dictionary/apply, No Known Date, 1 page.

\* cited by examiner

CAPSULES

FIELD OF THE DISCLOSURE

The disclosure relates to capsules and methods of making capsules for the transfer and triggered release of benefit agents.

BACKGROUND

Microencapsulation is a process where droplets of liquids, particles of solids or gasses are enclosed inside a solid shell and are generally in the micro-size range. The core material is then mechanically separated from the surrounding environment (Jyothi et al., *Journal of Microencapsulation*, 2010, 27, 187-197). Microencapsulation technology is attracting attention from various fields of science and has a wide range of commercial applications for different industries. Overall, capsules are capable of one or more of (i) providing stability of a formulation or material via the mechanical separation of incompatible components, (ii) protecting the core material from the surrounding environment, (iii) masking or hiding an undesirable attribute of an active ingredient and (iv) controlling or triggering the release of the active ingredient to a specific time or location. All of these attributes can lead to an increase of the shelf-life of several products and a stabilization of the active ingredient in liquid formulations.

Encapsulation can be found in areas such as pharmaceuticals, personal care, textiles, food, coatings and agriculture. In addition, the main challenge faced by microencapsulation technologies in real-world commercial applications is that a complete retention of the encapsulated active within the capsule is required throughout the whole supply chain, until a controlled or triggered release of the core material is applied (Thompson et al., *Journal of Colloid and Interface Science*, 2015, 447, 217-228). There are significantly limited microencapsulation technologies that are safe for both the environment and human health with a long-term retention and active protection capability that can fulfill the needs of the industry nowadays, especially when it comes to encapsulation of small molecules.

Over the past several years, consumer goods manufacturers have used core-shell encapsulation techniques to preserve actives, such as benefit agents, in harsh environments and to release them at the desired time, which may be during or after use of the consumer goods. Among the several mechanisms that can be used for release of benefit agent, the one commonly relied upon is mechanical rupture of the capsule shell. Selection of mechanical rupture as the release mechanism constitutes another challenge to the manufacturer, as rupture must occur at specific desired times, even if the capsules are subject to mechanical stress prior to the desired release time.

Industrial interest for encapsulation technology has led to the development of several polymeric capsules chemistries which attempt to meet the requirements of low shell permeability, high deposition, targeted mechanical properties and rupture profile. Increased environmental concerns have put the polymeric capsules under scrutiny, therefore manufacturers have started investigating sustainable solutions for the encapsulation of benefit agents. There is ample literature on sustainable capsules based on metal oxide or semi-metal oxides, mainly silica capsules; however, none of the capsules described in the literature provides the right balance of low shell permeability, mechanical properties, deposition, and rupture profile.

Capsules made with silane monomers only are known in the art. Multiple patent applications and academic publications disclose the use of monomers such as tetramethoxysilane (TMOS) and tetraethoxysilane (TEOS). The advantage of using such monomers is that they react faster than prepolymers made from similar monomers, and as such have been the favored option for years. This fast reaction time is due to their higher water solubility once partially hydrolyzed compared to larger precursors, due to the fact that the former have lower molecular weights, which accelerate further the overall hydrolysis kinetics as they are in an excess of water once dispersed in said phase.

Without wishing to be bound by theory, what is often the case is that the partially hydrolyzed monomers that are in an excess of water start condensing and forming ever larger particulate sols that are drawn to oil/water interfaces. Ultimately, the system desires to reduce surface energies of dispersed particulate sols by virtue of thermodynamic laws, which favors having the sols at the oil/water interfaces, especially when they grow large. The formation of such particulate sols can eventually lead to a shell around oil droplets and in some cases even shells that are strong enough towards mechanical self-integrity. However, by virtue of the geometrical properties (size, fractal dimensions, shapes etc.) of particulate sols, they are not able to form shells with a dense non-porous network that would provide low shell permeability.

Without wishing to be bound by theory, the applicant has surprisingly found that a careful selection of primary shell components, secondary shell components, core-shell ratio, and thickness of the shell allows production of metal oxide or semi-metal oxide based capsules which hold their mechanical integrity, have a low shell permeability once left air-drying on a surface and release their payload upon friction trigger. These properties are the desired results but are also characteristics of a dense and strong shell with low permeability made possible only by the judicious choice of component materials and conditions to assemble them.

SUMMARY

There is a need for an encapsulation technique that is both low toxicity and ecologically safe as an alternative to traditional synthetic chemicals. A methodology to encapsulate benefit agents via a green emulsification technique and sustainable materials in the shell is desired.

In accordance with embodiments, a population of capsules is provided wherein the capsules can include an oil-based core and a shell surrounding the core. In embodiments, the oil-based core can include a benefit agent. In embodiments, the shell can include a first shell component. In embodiments, the first shell component can include a condensed layer. In embodiments, the condensed layer can include a condensation product of a precursor. In embodiments, the precursor comprises at least one compound of Formula (I), Formula (II) or mixture thereof: $(M^vO_zY_n)_w$ (Formula I), where M is one or more of silicon, titanium and aluminum, v is the valence number of M and is 3 or 4, z is from 0.5 to 1.6, preferably 0.5 to 1.5, each Y is independently selected from —OH, —OR$^2$, halo,

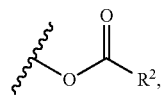

—$NH_2$, —$NHR^2$, —$N(R^2)_2$, and

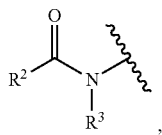

wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000; $(M'O_zY_nR^1_p)_w$ (Formula II), where M is one or more of silicon, titanium and aluminum, v is the valence number of M and is 3 or 4, z is from 0.5 to 1.6, preferably 0.5 to 1.5, each Y is independently selected from —OH, —$OR^2$, halo, —$NH_2$, —$NHR^2$, —$N(R^2)_2$, and, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0 to (v-1), each $R^1$ independently selected from a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, p is present in an amount up to pmax, and w is from 2 to 2000.

In accordance with embodiments, a population of capsules is provided wherein the capsules can include an aqueous core and a shell surrounding the core. In embodiments, the aqueous core can include a benefit agent. In embodiments, the shell can include a first shell component. In embodiments, the first shell component can include a condensed layer. In embodiments, the condensed layer can include a condensation product of a precursor. In embodiments, the precursor comprises at least one compound of Formula (I), Formula (II) or mixture thereof: $(M'O_zY_n)_w$ (Formula I), where M is one or more of silicon, titanium and aluminum, v is the valence number of M and is 3 or 4, z is from 0.5 to 1.6, preferably 0.5 to 1.5, each Y is independently selected from —OH, —$OR^2$, halo,

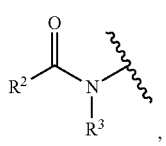

—$NH_2$, —$NHR^2$, —$N(R^2)_2$, and wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000; $(M'O_zY_nR^1_p)_w$ (Formula II), where M is one or more of silicon, titanium and aluminum, v is the valence number of M and is 3 or 4, z is from 0.5 to 1.6, preferably 0.5 to 1.5, each Y is independently selected from —OH, —$OR^2$, halo, —$NH_2$, —$NHR^2$, —$N(R^2)_2$, and, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0 to (v-1), each $R^1$ is independently selected from a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, p is present in an amount up to pmax, and w is from 2 to 2000.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any 10 of the exemplary embodiments, except as may be explicitly delineated in the corresponding written description. None of the drawings are necessarily to scale.

DETAILED DESCRIPTION

Figure 1:
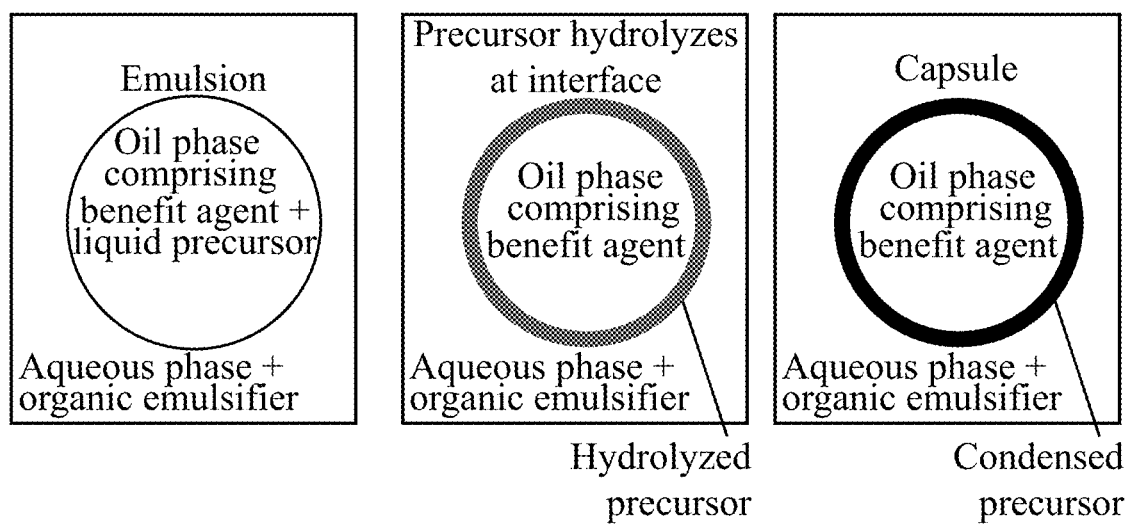
FIG. 1 is a schematic illustration of the method of making capsules in accordance with an embodiment of the disclosure prepared with a hydrophobic core.

As used herein, the articles "a" and "an" when used in a claim, are understood to mean one or more of what is claimed or described. As used herein, the terms "include," "includes," and "including" are meant to be non-limiting. The capsules of the present disclosure can comprise, consist essentially of, or consist of, the capsule components of the present disclosure.

Unless otherwise noted, all component levels are in reference to the active portion of that component, and are exclusive of impurities, for example, residual solvents or by-products, which may be present in commercially available sources of such components.

All temperatures herein are in degrees Celsius (° C.) unless otherwise indicated. Unless otherwise specified, all measurements herein are conducted at 20° C. and under the atmospheric pressure.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The present disclosure relates a population of capsules having a core surrounded by a shell. The population of capsules may include a core surrounded by substantially inorganic shell. The core can include one or more benefit agents. The shells of the capsules contain inorganic materials, the selection of which results in improved mechanical properties and low permeability. In various embodiments, the shell can include a first shell component and optionally a second shell component that surrounds the first shell component. Furthermore, the first shell component can include a condensed layer formed from the condensation product of a precursor. As described in detail below, the precursor can include one or more precursor compounds. In embodiments, the second shell component can include inorganic materials.

In embodiments, the first shell component is entirely inorganic. In embodiments, the first shell component can include up to 5% by weight of the first shell component organic material. For example, the organic material can be present in the precursor and/or added as a separate component. In embodiments, the organic material can be present from unreacted monomers or byproducts of the polymerization. In embodiments, organic material can be added to the first shell component.

In embodiments, the capsule can further include a second shell component wherein the second shell component surrounds the first shell component. In embodiments, the second shell component includes one or more of a metal oxide, a semi-metal oxide, a mineral and a metal. In embodiments the second shell component can include one or more of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, and copper. In embodiments, the second shell component is entirely or substantially entirely $SiO_2$.

In embodiments, the shell only includes the first shell component. In other embodiments, the shell includes both the first and the second shell component. In embodiments, the first shell component and the second shell component are entirely or substantially entirely $SiO_2$. It is also contemplated herein that the shell can include additional shell components. In various embodiments, the core can be an oil-based core. In other embodiments, the core can be a water-based core.

Population of Capsules

The present disclosure relates a population of capsules having a core surrounded by a shell. As described in more detail below, the capsules may include a core surrounded by substantially inorganic shell.

The capsules can have a mean shell thickness of 10 nm to 10,000 nm, preferably 170 nm to 1000 nm, more preferably 300 nm to 500 nm.

The capsules can have a mean volume weighted capsule diameter of 0.1 micrometers to 300 micrometers, preferably 10 micrometers to 200 micrometers, more preferably 10 micrometers to 50 micrometers. It has been advantageously found that large capsules (e.g., mean diameter of 10 micrometers or greater) can be provided in accordance with embodiments herein without sacrificing the stability of the capsules as a whole and/or while maintaining good fracture strength.

It has surprisingly been found that in addition to the inorganic shell, the volumetric core-shell ratio can play an important role to ensure the physical integrity of the capsules. Shells that are too thin vs. the overall size of the capsule (core:shell ratio>98:2) tend to suffer from a lack of self-integrity. On the other hand, shells that are extremely thick vs. the diameter of the capsule (core:shell ratio<80:20) tend to have higher shell permeability in a surfactant-rich matrix. While one might intuitively think that a thick shell leads to lower shell permeability (since this parameter impacts the mean diffusion path of the active across the shell), it has surprisingly been found that the capsules of this invention that have a shell with a thickness above a threshold have higher shell permeability. It is believed that this upper threshold is, in part, dependent on the capsule diameter.

The capsules may have a mean effective volumetric core-shell ratio of 50:50 to 99:1, preferably from 60:40 to 99:1, preferably 70:30 to 98:2, more preferably 80:20 to 96:4.

It may be desirable to have particular combinations of these capsule characteristics. For example, the capsules can have a mean effective volumetric core-shell ratio of about 99:1 to about 50:50, and have a mean volume weighted capsule diameter of about 0.1 µm to about 200 µm, and a mean shell thickness of about 10 nm to about 10,000 nm. The capsules can have a mean effective volumetric core-shell ratio of about 99:1 to about 50:50, and have a mean volume weighted capsule diameter of about 10 µm to about 200 µm, and a mean shell thickness of about 170 nm to about 10,000 nm. The capsules can have a mean effective volumetric core-shell ratio of about 98:2 to about 70:30, and have a mean volume weighted capsule diameter of about 10 µm to about 100 µm, and a mean shell thickness of about 300 nm to about 1000 nm.

Methods according to the present disclosure can produce capsule having a low coefficient of variation of capsule diameter. Control over the distribution of size of the capsules can beneficially allow for the population to have improved and more uniform fracture strength. A population of capsules can have a coefficient of variation of capsule diameter of 40% or less, preferably 30% or less, more preferably 20% or less.

For capsules containing a core material to perform and be cost effective in consumer goods applications, which includes but is not limited to surface cleaners, wipes and dry cloths, they should: i) be resistant to core diffusion during the shelf life of the liquid product (e.g., low leakage or permeability); ii) have ability to deposit on the targeted surface during application and iii) be able to release the core material by mechanical shell rupture at the right time and place to provide the intended benefit for the end consumer.

The capsules described herein can have an average fracture strength of 0.1 MPa to 10 MPa, preferably 0.25 MPa to 5 MPa, more preferably 0.25 MPa to 3 MPa. Fully inorganic capsules have traditionally had poor fracture strength, whereas for the capsules described herein, the fracture strength of the capsules can be greater than 0.25 MPa, providing for improved stability and a triggered release of the benefit agent upon a designated amount of rupture stress.

In embodiments, the capsule shells advantageously have low permeability, which advantageously allows for slow diffusion of the encapsulated benefit agent when deposited on the target substrate.

In embodiments, capsules can have improved core retention, for example, demonstrating reduced shell permeability and slow diffusion of the encapsulated benefit agent upon drying on a substrate. Without intending to be bound by theory, it is believed that capsule shells in accordance with embodiments of the disclosure have low porosity and high density, thereby enhancing the stability of the capsules as compared to conventional inorganic capsules. Further, without intending to be bound by theory, it is believed that the improved shell architecture allows for targeted fracture strengths to be achieved allowing ultimate fracture at the targeted pressure during use. That is, despite increased density and structural stability, the capsules remain capable of performing as intended and fracturing at the desired and intended pressures during use.

Core

The capsules include a core. The core may be oil-based, or the core may be aqueous. Preferably, the core is oil-based. The core may be a liquid at the temperature at which it is utilized in a formulated product. The core may be a liquid at and around room temperature.

The core includes perfume. The core may comprise from about 1 wt % to 100 wt % perfume, based on the total weight of the core. Preferably, the core can include 50 wt % to 100 wt % perfume based on the total weight of the core, more preferably 80 wt % to 100 wt % perfume based on the total weight of the core. Typically, higher levels of perfume are preferred for improved delivery efficiency.

The perfume may comprise one or more, preferably two or more, perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitriles and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method described in Test methods section. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

The perfume capsule comprises a perfume. Preferably, the perfume of the capsule comprises a mixture of at least 3, or even at least 5, or at least 7 perfume raw materials. The perfume of the capsule may comprise at least 10 or at least 15 perfume raw materials. A mixture of perfume raw materials may provide more complex and desirable aesthetics, and/or better perfume performance or longevity, for example at a variety of touchpoints. However, it may be desirable to limit the number of perfume raw materials in the perfume to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core may comprise, in addition to perfume raw materials, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

The core of the encapsulates of the present disclosure may comprise a core modifier, such as a partitioning modifier and/or a density modifier. The core may comprise, in addition to the perfume, from greater than 0% to 80%, preferably from greater than 0% to 50%, more preferably from greater than 0% to 30% based on total core weight, of a core modifier. The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soybean oil. US Patent Application Publication 20110268802, incorporated herein by reference, describes other partitioning modifiers that may be useful in the presently described perfume encapsulates.

In embodiments, the water-based core can include about 1 wt % to 99 wt % benefit agent based on the total weight of the core. In embodiments, the core can include about 1 wt % to 75 wt % benefit agent based on the total weight of the core or about 1 wt % to 50 wt % benefit agent based on the total weight of the core. For example, the core can include a benefit agent based on the total weight of the core of about 1 wt %, 5 wt %, 10 wt %, 15 wt %, 20 wt %, 25 wt %, 30 wt %, 35 wt %, 40 wt %, 45 wt %, and 50 wt %. In embodiments, the core can include about 1 wt % to 20 wt %, 30 wt % to 50 wt %, or 20 wt % to 40 wt %, benefit agent based on the total weight of the core.

In embodiments, the water-based and/or water soluble benefit agent is one or more of perfume compositions, perfume raw materials, perfume, skin coolants, vitamins, sunscreens, antioxidants, glycerin, bleach encapsulates, chelating agents, antistatic agents, insect and moth repelling agents, colorants, antioxidants, sanitization agents, disinfecting agents, germ control agents, mold control agents, mildew control agents, antiviral agents, drying agents, stain resistance agents, soil release agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, and natural actives, antibacterial actives, antiperspirant actives, cationic polymers, dyes, metal catalysts, non-metal catalysts, activators, pre-formed peroxy carboxylic acids, diacyl peroxides, hydrogen peroxide sources, and enzymes.

In embodiments, the benefit agent can have an average log P less than or equal to 1.

Shell

The capsules of the present disclosure include a shell that surrounds the core.

The shell can include a first shell component and optionally a second shell component that surrounds the first shell component. The first shell component can include a condensed layer formed from the condensation product of a precursor. As described in detail below, the precursor can include one or more precursor compounds. The second shell component can include inorganic materials.

The organic emulsifier can be partially or totally included in either the first or second shell component. In embodiments, the organic emulsifier can be partially or totally included in both the first and second shell component. In embodiments, the organic emulsifier can be excluded from both first and second shell component. The organic emulsifier included in a shell component can be covalently or non-covalently bounded with the said shell component.

The shell may be substantially inorganic (defined later). The substantially inorganic shell can include a first shell component comprising a condensed layer surrounding the core. The substantially inorganic shell may further comprise a second layer component surrounding the first shell component. The first shell component comprises inorganic materials, preferably metal/semi-metal oxides, more preferably SiO2, TiO2 and $Al_2O_3$, and even more preferably SiO2. The second shell component comprises inorganic material, preferably comprising materials from the groups of Metal/semi-metal oxides, metals and minerals, more preferably materials chosen from the list of $SiO_2$, $TiO_2$, $Al_2O_3$, $ZrO_2$, $ZnO_2$, $CaCO_3$, $CazSiO_4$, $Fe_2O_3$, $Fe_3O_4$, clay, gold, silver, iron, nickel, and copper, even more preferably chosen from $SiO_2$ and $CaCO_3$. Preferably, the second shell component material is of the same type of chemistry as the first shell component in order to maximize chemical compatibility.

The first shell component can include a condensed layer surrounding the core. The condensed layer can be the condensation product of one or more precursors. The one or more precursors may comprise at least one compound from the group consisting of Formula (I), Formula (II), and a mixture thereof, wherein Formula (I) is $(M'O_zY_n)_w$, and wherein Formula (II) is $(M'O_zY_nR^1_p)_w$. Formulas (I) and (II) are described in more detail below.

The one or more precursors can be of Formula (I):

$$(M'O_zY_n)_w \qquad \text{(Formula I)},$$

where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR^2$, —$N(R^{32}$, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000.

The one or more precursors can be of Formula (I) where M is silicon. It may be that Y is —$OR^2$. It may be that n is 1 to 3. It may be preferable that Y is —$OR^2$ and n is 1 to 3. It may be that n is at least 2, one or more of Y is —$OR^2$, and one or more of Y is —OH.

$R^2$ may be $C_1$ to $C_{20}$ alkyl. $R^2$ may be $C_6$ to $C_{22}$ aryl. $R^2$ may be one or more of $C_1$ alkyl, $C_2$ alkyl, $C_3$ alkyl, $C_4$ alkyl, $C_5$ alkyl, $C_6$ alkyl, $C_7$ alkyl, and $C_8$ alkyl. $R^2$ may be $C_1$ alkyl. $R^2$ may be $C_2$ alkyl. $R^2$ may be $C_3$ alkyl. $R^2$ may be $C_4$ alkyl.

It may be that z is from 0.5 to 1.3, or from 0.5 to 1.1, 0.5 to 0.9, or from 0.7 to 1.5, or from 0.9 to 1.3, or from 0.7 to 1.3.

It may be preferred that M is silicon, v is 4, each Y is —$OR^2$, n is 2 and/or 3, and each $R^2$ is $C_2$ alkyl.

The precursor can include polyalkoxysilane (PAOS). The precursor can include polyalkoxysilane (PAOS) synthesized via a hydrolytic process.

The precursor can alternatively or further include one or more of a compound of Formula (II):

(Formula II), where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR^2$, —$N(R^3)_2$, wherein $R^2$ is selected from a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0 to (v-1), each $R^1$ is independently selected from a C to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, or a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, p is present in an amount up to pmax, and w is from 2 to 2000; wherein pmax=60/[9*Mw($R^1$)+8], where Mw($R^1$) is the molecular weight of the $R^1$ group.

$R^1$ may be a $C_1$ to $C_{30}$ alkyl substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl. $R^1$ may be a $C_1$ to $C_{30}$ alkylene substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl.

The precursors of formula (I) and/or (II) may be characterized by one or more physical properties, namely a molecular weight (Mw), a degree of branching (DB) and a polydispersity index (PDI) of the molecular weight distribution. It is believed that selecting particular Mw and/or DB can be useful to obtain capsules that hold their mechanical integrity and have low shell permeability once left drying on a surface. The precursors of formula (I) and (II) may be characterized as having a DB between 0 and 0.6, preferably between 0.1 and 0.5, more preferably between 0.19 and 0.4, and/or a Mw between 600 Da and 100000 Da, preferably between 700 Da and 60000 Da, more preferably between 1000 Da and 30000 Da. The characteristics provide useful properties of said precursor in order to obtain capsules of the present invention. The precursors of formula (I) and/or (II) can have a PDI between 1 and 50.

Without wishing to be bound by theory, it is believed that by anchoring inorganic precursors of formula (I) to the interface so neatly, a low water environment is provided, which has structural impacts on the resulting shell. Such a low water environment will lead to a considerably slower reaction time than if monomeric precursors or low Mw oligomers were used, due to a limited contact between the reacting species (i.e. water and precursor). In this invention we have overcome these drawbacks by carefully selecting the type of precursor used, leading to the formation of a dense capsule shell. Without being limited to theory it is believed that upon hydrolysis, inorganic precursors with a low Mw are not interfacially active enough to start forming the first shell component, and thus a large fraction disperses into the aqueous phase, reducing the final yield of the shell formation. Once a shell has started to form, inorganic precursors with a low Mw can still diffuse through the forming shell further reducing the desired yield of the shell. In addition, inorganic precursors with a too small degree of branching have fractal dimensions such that they would be mutually transparent towards each other (Applied Catalysis A, vol 96, pp 103, 1993), meaning that two precursors with low Mw and low DB are less likely to react with each other to form a solid shell, either leaving voids in the shell or resulting in loss of the precursors to the aqueous phase. If a higher concentration of inorganic precursor is used to compensate such loss, the water phase will contain too much inorganic precursor and eventually the whole system will gel. Finally, inorganic precursors immersed in excess water (i.e. dispersed in water) tend to react faster, and lead to fast growth of ever larger polymers and particles. As has been explained above, larger polymers and particles have limited interpenetration into an existing network and therefore would not increase the yield of the shell or at the very least not provide a dense enough shell.

Therefore, to obtain capsules according to the present invention, capsules having a dense and strong shell characterized by low shell permeability upon drying on substrate and the ability for mechanical self-integrity, precursors having a degree of branching above 0.19, preferably above 0.2 and a molecular weight above 600 Da, preferably above 700 Da, preferably above 1000 Da are necessary.

The condensed layer comprising metal/semi-metal oxides may be formed from the condensation product of a precursor comprising at least one compound of formula (I) and/or at least one compound of formula (II), optionally in combination with one or more monomeric precursors of metal/semi-metal oxides, wherein said metal/semi-metal oxides comprise TiO2, Al2O3 and SiO2, preferably SiO2. The monomeric precursors of metal/semi-metal oxides may include compounds of the formula $M(Y)_{v-n}R_n$ wherein M, Y and R are defined as in formula (II), and n can be an integer between 0 and 3. The monomeric precursor of metal/semi-metal oxides may be preferably of the form where M is Silicon wherein the compound has the general formula $Si(Y)_{4-n}R_n$ wherein Y and R are defined as for formula (II) and n can be an integer between 0 and 3. Examples of such monomers are TEOS (tetraethoxy orthosilicate), TMOS (tetramethoxy orthosilicate), TBOS (tetrabutoxy orthosilicate), triethoxymethylsilane (TEMS), diethoxy-dimethylsilane (DEDMS), trimethylethoxysilane (TMES), and tetraacetoxysilane (TAcS). These are not meant to be limiting the scope of monomers that can be used and it would be apparent to the person skilled in the art what are the suitable monomers that can be used in combination herein.

The capsules of the present disclosure may be defined as comprising a substantially inorganic shell comprising a first shell component and a second shell component. By substantially inorganic it is meant that the first shell component can comprise up to 1 wt %, or up to 10 wt % of organic content, preferably up to 5 wt % of organic content, as defined later in the organic content calculation.

While the first shell component is useful to build a mechanically robust scaffold or skeleton, it can also provide low shell permeability upon drying on substrates. The second shell component can greatly reduces the shell permeability which improves the retention of core materials, as determined by the core retention test, described hereafter. A second shell component can also greatly improve capsule mechanical properties, such as a capsule rupture force and fracture strength. Without intending to be bound by theory, it is believed that a second shell component contributes to the densification of the overall shell by depositing a precursor in pores remaining in the first shell component. A second shell component also adds an extra inorganic layer onto the surface of the capsule. These improved shell permeabilities and mechanical properties provided by the 2nd shell component only occur when used in combination with the first shell component as defined in this invention.

The mechanism of the shell formation of the present invention can be described as "brick and mortar". More specifically, the first shell component composed of high molecular weight polyalkoxysilane (PAOS) compound act as the "bricks", providing structural integrity and mechanical resistance of the capsule shell. The second shell component composed of a low molecular weight compound will diffuse within the interstitial space between the bricks, acting as mortar to further increase the mechanical strength of the shell and drastically reduce the shell permeability.

Improved capsule mechanical properties provided by use of a second shell component, as disclosed in this invention, can only be achieved in combinations with unique first shell components. Capsules made from tetraethoxysilane (TEOS) and commercial polyethoxysilanes (e.g. Evonik Dynasylan 40), for example, do not provide satisfactory mechanical properties when further combined with inorganic second shell components. It is the unique combination of the first shell and second shell components, as disclosed in this invention, that provides both low shell permeability upon drying on substrate and mechanical robustness.

Without desiring to be bound by theory, it is believed that the second shell component, as disclosed in the present invention has the unique property of depositing into the first shell component micropores and covers most of the final capsule surface, thus providing an improved mechanical robustness of the capsule. Filling of the micropores reduces the formation of microcracks when the capsule is under stress by high agitation and upon shell drying. A common solution to the formation of capsule shell microcracks can be the use of labile spacers in the capsule shell network, but this requires the introduction of organic materials, and these generally greatly increase the shell permeability.

Process of Making Capsules

Capsules of the present disclosure may be formed by first admixing a hydrophobic material with any of the precursors of the condensed layer as defined above, thus forming the oil phase, wherein the oil phase can include an oil-based and/or oil-soluble precursor. Said precursor/hydrophobic material mixture is then either used as a dispersed phase or as a continuous phase in conjunction with a water phase, where in the former case an O/W (oil-in-water) emulsion is formed and in the latter a W/O (water-in-oil) emulsion is formed once the two phases are mixed and homogenized via methods that are known to the person skilled in the art. Organic emulsifier can be present in the water phase and/or the oil phase, irrespective of the type of emulsion that is desired. The oil phase can include an oil-based core modifier and/or an oil-based benefit agent and a precursor of the condensed layer. Suitable core materials to be used in the oil phase are described earlier in this document.

Once either emulsion is formed, the following steps may occur:

(a) the organic emulsifiers migrate to the oil/water interface, thus stabilizing the O/W or W/O emulsion.

(b) The precursor of the condensed layer comprising precursors of metal/semi-metal oxides will start undergoing a hydrolysis/condensation reaction with the water at the oil/water interface, thus forming the condensed layer (FIG. 1).

The precursor forming the condensed layer can be present in an amount between 1 wt % and 50 wt %, preferably between 10 wt % and 40 wt % based on the total weight of the oil phase.

The oil phase composition can include any compounds as defined in the core section above. The oil phase, prior to emulsification, can include between 10 wt % to about 99 wt % benefit agent.

In the method of making capsules according to the present disclosure, the oil phase may be the dispersed phase, and the continuous aqueous (or water) phase can include water, an acid or base, and organic emulsifiers. The aqueous (or water) phase may have a pH between 1 and 11, preferably between 1 and 7 at least at the time of admixing both the oil phase and the aqueous phase together. The acid can be a strong acid. The strong acid can include one or more of HCl, $HNO_3$, $H_2SO_4$, HBr, HI, $HClO_4$, and $HClO_3$, preferably HCl. The acid can be a weak acid. The weak acid can be acetic acid or HF. The concentration of the acid in the continuous aqueous phase can be between $10^{-7}$M and 5M. The base can be a mineral or organic base, preferably a mineral base. The mineral base can be a hydroxide, such as sodium hydroxide and ammonia. For example, the mineral base can be about $10^{-5}$ M to 0.01M NaOH, or about $10^{-5}$ M to about 1M ammonia. The list of acids and bases and their concentration ranges exemplified above is not meant to be limiting the scope of the invention, and other suitable acids and bases that allow for the control of the pH of the continuous phase are contemplated herein.

In the method of making the capsules according to the present disclosure, the aqueous phase can include one or more organic emulsifiers. Organic emulsifiers can be organic surfactants or organic polymers (organic polymeric emulsifiers).

In the method of making the capsules according to the present disclosure, organic surfactants can be anionic, cationic, non-ionic or amphoteric surfactants. Anionic surfactants can be alkyl sulfates, alkyl sulfonates, alkyl phosphates, alkyl carboxylates, alkyl ethoxylated sulfates, alkyl ethoxylated sulfonates, alkyl ethoxylated phosphates, alkyl ethoxylated carboxylates. Cationic surfactants can be alkyl ammonium salts, alkyl amines. Non-ionic surfactants can be alkyl ethoxylates, alkyl phenol ethoxylates, alkyl polyglucosides, alkyl polysorbates, sorbitan esters, glycerol esters. Amphoteric surfactants can be amine oxides, amine betaines. Organic surfactants can be one or more of sodium dodecyl sulfates, Triton X, Span 20, Span 80, cetyl trimethylammonium chloride, cocamido propyl betaine.

In the method of making the capsules according to the present disclosure, organic polymeric emulsifiers can be polymers containing carboxylic acid groups, copolymers of vinyl and carboxylic acid groups, polymers containing quaternized ammonium salt groups, polymers containing nitrogen-based cationic groups, polysaccharides, anionically modified polysaccharides, cationically modified polysaccharides. Organic polymeric emulsifier can be one or more of polyvinyl alcohol, copolymer of vinyl alcohol and vinyl acetate, polyethylene glycol, copolymer of ethylene oxide and propylene oxide, copolymers of ethylene and maleic anhydride, copolymer of butene and maleic anhydride, copolymer of styrene and maleic anhydride, Tween 20, Tween 80, Chitosan, Gelatin, Gum Arabic, Polyethylene imine, polyvinyl pyrrolidone.

In the method of making the capsules according to the present disclosure, the pH can be varied throughout the process by the addition of an acid and/or a base. For example, the method can be initiated with an aqueous phase at an acidic or neutral pH and then a base can be added during the process to increase the pH. Alternatively, the method can be initiated with an aqueous phase at a basic or neutral pH and then an acid can be added during the process to decrease the pH. Still further, the method can be initiated with an aqueous phase at an acid or neutral pH and an acid can be added during the process to further reduce the pH. Yet further the method can be initiated with an aqueous phase at a basic or neutral pH and a base can be added during the process to further increase the pH. Any suitable pH shifts can be used. Further any suitable combinations of acids and bases can be used at any time in the method to achieve a desired pH. Any of the organic emulsifiers described above can be used in the aqueous phase. The organic emulsifiers can be present in an amount of about 0.01 wt % to about 10 wt % based on the total weight of the aqueous phase.

The method can include admixing the oil phase and the aqueous phase in a ratio of oil phase to aqueous phase of about 1:10 to about 1:1.

The second shell component can be formed by admixing capsules having the first shell component with a solution of second shell component precursor. The solution of second shell component precursor can include a water soluble or oil soluble second shell component precursor. The second shell component precursor can be one or more of a compound of formula (I) as defined above, tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS). The second shell component precursor can also include one or more of silane monomers of type $Si(Y)_{4-n}R_n$ wherein Y is a hydrolysable group and R is a non-hydrolysable group and n can be an integer between 0 and 3. Examples of such monomers are given earlier in this paragraph, and these are not meant to be limiting the scope of monomers that can be used. The second shell component precursor can include salts of silicate, titanate, aluminate, zirconate and/or zincate. The second shell component precursor can include carbonate and calcium salts. The second shell component precursor can include salts of iron, silver, copper, nickel, and/or gold. The second shell component precursor can include zinc, zirconium, silicon, titanium, and/or aluminum alkoxides. The second shell component precursor can include one or more of silicate salt solutions such as sodium silicates, silicon tetralkoxide solutions, iron sulfate salt and iron nitrate salt, titanium alkoxides solutions, aluminum trialkoxide solutions, zinc dialkoxide solutions, zirconium alkoxide solutions, calcium salt solution, carbonate salt solution. A second shell component comprising $CaCO_3$ can be obtained from a combined use of calcium salts and carbonate salts. A second shell component comprising $CaCO_3$ can be obtained from Calcium salts without addition of carbonate salts, via in-situ generation of carbonate ions from $CO_2$.

The second shell component precursor can include any suitable combination of any of the foregoing listed compounds.

The solution of second shell component precursor can be added dropwise to the capsules comprising a first shell component. The solution of second shell component precursor and the capsules can be mixed together between 1 minute and 24 hours. The solution of second shell component precursor and the capsules can be mixed together at room temperature or at elevated temperatures, such as 20° C. to 100° C.

The second shell component precursor solution can include the second shell component precursor in an amount between 1 wt % and 50 wt % based on the total weight of the solution of second shell component precursor.

Capsules with a first shell component can be admixed with the solution of the second shell component precursor at a pH of between 1 and 11. The solution of the second shell precursor can contain an acid and/or a base. The acid can be a strong acid. The strong acid can include one or more of HCl, $HNO_3$, $H_2SO_4$, HBr, HI, $HC_{104}$, and $HClO_3$, preferably HCl. In other embodiments, the acid can be a weak acid. In embodiments, said weak acid can be acetic acid or HF. The concentration of the acid in the second shell component precursor solution can be between $10^{-7}$M and 5M. The base can be a mineral or organic base, preferably a mineral base. The mineral base can be a hydroxide, such as sodium hydroxide and ammonia. For example, the mineral base can be about $10^{-5}$ M to 0.01M NaOH, or about $10^{-5}$ M to about 1M ammonia. The list of acids and bases exemplified above is not meant to be limiting the scope of the invention, and other suitable acids and bases that allow for the control of the pH of the second shell component precursor solution are contemplated herein.

The process of forming a second shell component can include a change in pH during the process. For example, the process of forming a second shell component can be initiated at an acidic or neutral pH and then a base can be added during the process to increase the pH. Alternatively, the process of forming a second shell component can be initiated at a basic or neutral pH and then an acid can be added during the process to decrease the pH. Still further, the process of forming a second shell component can be initiated at an acid or neutral pH and an acid can be added during the process to further reduce the pH. Yet further the process of forming a second shell component can be initiated at a basic or neutral pH and a base can be added during the process to further increase the pH. Any suitable pH shifts can be used. Further any suitable combinations of acids and bases can be used at any time in the solution of second shell component precursor to achieve a desired pH. The process of forming a second shell component can include maintaining a stable pH during the process with a maximum deviation of +/−0.5 pH unit. For example, the process of forming a second shell component can be maintained at a basic, acidic or neutral pH. Alternatively, the process of forming a second shell component can be maintained at a specific pH range by controlling the pH using an acid or a base. Any suitable pH range can be used. Further any suitable combinations of acids and bases can be used at any time in the solution of second shell component precursor to keep a stable pH at a desirable range.

Whether making an oil-based core or aqueous core, the emulsion can be cured under conditions to solidify the precursor thereby forming the shell surrounding the core.

The reaction temperature for curing can be increased in order to increase the rate at which solidified capsules are obtained. The curing process can induce condensation of the precursor. The curing process can be done at room temperature or above room temperature. The curing process can be done at temperatures 30° C. to 150° C., preferably 50° C. to 120° C., more preferably 80° C. to 100° C. The curing process can be done over any suitable period to enable the capsule shell to be strengthened via condensation of the precursor material. The curing process can be done over a period from 1 minute to 45 days, preferably 1 hour to 7 days, more preferably 1 hour to 24 hours. Capsules are considered cured when they no longer collapse. Determination of capsule collapse is detailed below. During the curing step, it is believed that hydrolysis of Y moieties (from formula (I) and/or (II)) occurs, followed by the subsequent condensation of a —OH group with either another —OH group or another moiety of type Y (where the 2 Y moieties are not necessarily the same). As the shell formation progresses, the precursor moieties will react with said preformed shell.

The emulsion can be cured such that the shell precursor undergoes condensation. Shown below are examples of the hydrolysis and condensation steps described herein for silica-based shells:

Hydrolysis: ≡Si—OR+H$_2$O→≡Si—OH+ROH
Condensation: ≡Si—OH+≡Si—OR→≡Si—O—Si≡+ROH
≡Si—OH+≡Si—OH→≡Si—O—Si≡+H$_2$O.

For example, when a precursor of formula (I) or (II) is used, the following describes the hydrolysis and condensation steps:

Hydrolysis: ≡M-Y+H$_2$O→∈M-OH+YH
Condensation: ≡M-OH+≡M-Y→≡M-O-M≡+YH
≡M-OH+≡M-OH→≡M-O-M≡+H$_2$O.

The capsules may be provided as a slurry composition (or simply "slurry" herein). The result of the methods described herein may be a slurry containing the capsules. The slurry can be formulated into a product, such as a consumer product.

In embodiments, the method can further include washing and drying the capsules after the process of forming the second shell component, using any suitable methods. For example, centrifugation can be used in a washing step. Drying methods are known in the art. One example of drying can be spray drying.

In embodiments, the result of the methods herein is a slurry containing the capsules. In embodiments, the slurry can be formulated into a product, such as a consumer product. The formulated product can include in addition to the slurry one or more processing aids. In embodiments, the processing aids can include one or more of water, aggregate inhibiting materials such as divalent salts, and particle suspending polymers. In embodiments, the aggregate inhibiting materials can include salts that can have a charge-shielding effect around the capsule, such as magnesium chloride, calcium chloride, magnesium bromide, and magnesium sulfate. In embodiments, formulated product can further include one or more of xanthan gum, carrageenan gum, guar gum, shellac, alginates, chitosan; cellulosic materials such as carboxymethyl cellulose, hydroxypropyl methyl cellulose, cationic cellulosic materials; polyacrylic acid; polyvinyl alcohol; hydrogenated castor oil; and ethylene glycol distearate. In embodiments, the formulated product can include one or more carriers. In embodiments, the carriers can be one or more polar solvents, including but not limited to, water, ethylene glycol, propylene glycol, polyethylene glycol, and glycerol; and nonpolar solvents, including but not limited to, mineral oil, perfume raw materials, silicone oils, and hydrocarbon paraffin oils. In embodiments, the formulated product can include one or more of silica, citric acid, sodium carbonate, sodium sulfate, sodium chloride, and binders such as sodium silicates, modified celluloses, polyethylene glycols, polyacrylates, polyacrylic acids, and zeolites.

Capsules of the present invention can be formed from polyalkoxysilane (PAOS) or polyalkoxysilanes bearing non-hydrolysable moieties. Those later PAOS yield capsules with residual organic moieties in the shell. It has been found that capsules with residual organic moieties in the shell present a significantly higher shell permeability compared to capsules without residual organic moieties. The addition of a second shell component formation step reduces the shell permeability of capsules, thereby allowing a certain quantity of organic moieties into the first shell component without increasing too much shell permeability. The primary purpose of PAOS is to produce capsules that do not collapse and have good mechanical properties, while also providing a low shell permeability. Further, comparative testing, as shown below, demonstrates shell permeability is reduced when capsules are produced using PAOS and not organo-silanes.

Therefore, whilst capsules comprising a first shell component and a second shell component, where the first shell component comprises condensation products of a precursor of Formula (I), are a preferred embodiment, it has been found that the first shell component can tolerate a fraction of condensation products of a precursor of formula (II), or a mixture of precursors of formula (I) or (II), and monomers bearing one, two or three silicon carbon bonds, without complete loss of permeability resistance in a surfactant based matrix in the resultant capsules.

The fraction of condensation products of a precursor of formula (II) is defined as leading to a total first shell composition comprising less than 10 wt %, preferably less than 9 wt %, preferably less than 8 wt %, preferably less than 7 wt %, preferably less than 6 wt %, preferably less than 5 wt %, preferably less than 4 wt %, preferably less than 3 wt %, preferably less than 2 wt % preferably less than 1 wt % of organic content, as defined in the organic content calculation section.

Without desiring to be bound by theory, it is believed that the organic compounds can act as spacers within the shell thus reducing the crosslink density of the first shell component, which in too large of quantities can provide substantial porosity. First shell components that have a sufficiently low level of organic compounds therefore can result in higher shell permeability in surfactant-based matrices while still containing enough capability towards self-integrity when drying on a surface.

As defined earlier, whilst the first shell components can be used as a scaffold or skeleton for the capsule in order to provide mechanical resistance, while still supplying reduced shell permeability upon drying on substrate in certain embodiments, the inclusion of a second shell component greatly reduces the shell permeability upon drying on substrate. In embodiments, the precursor includes at least one compound of formula (I) and/or at least one compound of formula (II) in combination with one or more of tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS).

In embodiments, emulsifying the dispersed phase and continuous phase can include one or more of a high shear homogenization process, a microfluidization process, and an ultrasonication process. In embodiments, the emulsification of the dispersed phase and continuous phase can include a high shear homogenization process. In embodiments, the high shear homogenization process can include one or more mixers, such as an ultraturrax mixer or a vortex mixer. In embodiments, the mixer can have a speed of 100 rpm to 20,000 rpm, or 500 rpm to 15,000 rpm, or 1000 rpm to 10,000 rpm, or 2000 rpm to 10,000 rpm. For example, the mixer can have a speed of 1000 rpm, 1500 rpm, 2000 rpm, 2500 rpm, 3000 rpm, 3500 rpm, 4000 rpm, 4500 rpm, 5000 rpm, 6000 rpm, 7000 rpm, 8000 rpm, 9000 rpm, or 10,000 rpm.

In embodiments, the dispersed phase and the continuous phase can be emulsified for about 1 minute to about 2 hours, or about 1 minute to about 30 minutes, or about 1 minute to about 10 minutes. For example, the emulsification can be 1 minute, 2 minutes, 3 minutes, 4 minutes, 5 minutes, 6 minutes, 7 minutes, 8 minutes, 9 minutes or 10 minutes.

In embodiments, the emulsion can be formed substantially free of surfactant. In embodiments, the emulsion being "substantially free" of surfactant includes surfactant in an amount of 0.001% w/w or less.

In embodiments, a curing process can be used to solidify the shell. In embodiments, the curing process can induce condensation of the precursor. In embodiments, the curing process can be done at room temperature or above room temperature. In embodiments, the curing process can be done at temperatures above 30° C. For example, the curing process can be done at 30° C. to 150° C., 40° C. to 120° C., 50° C. to 100° C., 60° C. to 100° C., 70° C. to 100° C., or 30° C., 40° C., 50° C., 60° C., 70° C., 75° C., 80° C., 90° C., 100° C., 110° C., 120° C., 130° C., 140° C., or 150° C.

In embodiments, the curing process can be done over any suitable period of time to enable the capsule shell to be strengthened via condensation of the precursor material. In embodiments, the curing process can be done over a period of time from 1 minute to 45 days, or 1 minute to 10 days, or 1 minute to 5 days, or 1 minute to 24 hours. For example, the curing process can be done over, 1 minute, 1 hour, 2 hours, 3 hours, 4 hours, 5 hours, 6 hours, 12 hours, 24 hours, 48 hours, 72 hours, 96 hours, 5 days, 6 days, 7 days, 8 days, 9 days, 10 days, 15 days, 20 days, 21 days, 25 days, 30 days, 35, days 40 days, or 45 days. Longer cure times can also be contemplated in the methods described herein.

Test Methods
Coefficient of Variation of Capsule Diameter

Capsule size distribution is determined via single-particle optical sensing (SPOS), also called optical particle counting (OPC), using the AccuSizer 780 AD instrument or equivalent and the accompanying software CW788 version 1.82 (Particle Sizing Systems, Santa Barbara, California, U.S.A.), or equivalent. The instrument is configured with the following conditions and selections: Flow Rate=1 mL/sec; Lower Size Threshold=0.50 µm; Sensor Model Number=LE400-05SE or equivalent; Auto-dilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at most 9200 per mL.

During a time period of 60 seconds the suspension is analyzed. The range of size used was from 1 µm to 493.3 µm.

Volume Distribution:

$$CoV_v(\%) = \frac{\sigma_v}{\mu_v} * 100$$

$$\sigma_v = \sum_{i=1um}^{493.3um} (x_{i,v} * (d_i - \mu_v)^2)0.5$$

$$\mu_v = \frac{\sum_{i=1um}^{493.3um} (x_{i,v} * d_i)}{\sum_{i=1um}^{493.3um} x_{i,v}}$$

Where:
$CoV_v$—Coefficient of variation of the volume weighted size distribution
$\sigma_v$—Standard deviation of distribution of volume distribution
$\mu_v$—mean of the distribution of volume distribution
$d_i$—diameter in fraction i
$x_{i,v}$—frequency in fraction i (corresponding to diameter i) of volume distribution $$x_{i,v} = \frac{x_{i,n} * d_i^3}{\sum_{i=1um}^{493.3um} (x_{i,n} * d_i^3)}$$

Core Retention Test

The purpose of this test is to assess the core retention of the capsules of this invention and comparative capsules. Capsules are typically formed in an aqueous dispersion, but the interest of this test is to ascertain the properties of the capsules once they have dried, more specifically when they have dried on a surface or substrate (e.g. flat surface, porous surface).

By core retention it is meant to quantify in an olfactive way how much encapsulated oil is left within the capsules once they have dried for a given amount of time. For certain applications it is important to keep the permeability of the shell low, such that the active can be delivered by friction at the appropriate time, instead of only after a few hours after drying. This test in effect correlates the shell permeability with the core retention, since the more oil is left within the capsule after a given amount of time, the lower the permeability of the active is through the shell.

Method:
Each sample will undergo the following steps:
1. Dilution of the slurry in water
2. Deposition of the dilution upon microscopy slides
3. Drying of the contents of each microslide
4. Olfactive assessment
1. A slurry is diluted using the following formula:
Prepare 6 ml of DI water, add a certain volume of well homogenized slurry into this, according to the following formula:

$$\text{Volume slurry to add (Microliters)} = \frac{75*6}{0.4*\% Act*100}$$

where % Act is the perfume activity of the slurry. The perfume activity of the slurry is defined as the weight percentage of perfume with respect to the whole slurry. The above formula will give the volume of slurry in microliters to be added into the 6 ml of DI water.

It should be noted that by virtue of adding varying volumes of slurry into a fixed amount of DI water, the total perfume content on each microslide is not controlled. However, the differences are minimal and will not impact the overall results.

Figure 21:
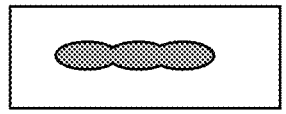
FIGS. 21, 22, and 23 illustrate samples during the core retention test.

2. 100 microLiters aliquots of a homogenized dilution made in step 1 are introduced onto 10 different microscopy glass slides, such that we have 10 microslides containing 100 microLiters of dilution each. See FIG. 21.

3 Once the aliquots have been introduced on the glass slides, they are left drying at room temperature on a lab bench, outside of a fume hood for 24 hours.

4 Once dried, the capsules are assessed for their core retention. A panel of 10 people is needed for this test, as there will be 10 replicates of each sample.

For each microslide, the following steps are the guidelines to make the olfactive assessment:

1—Sniff the dry microslide at no more than 5 cm of distance.

Figure 22:
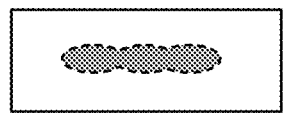

2—Put a second but empty microslide on top of the microslide containing the dried dilution, such that the dry substance is trapped between the two slides. See FIG. 22.

Figure 23:
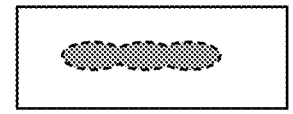

3—Squeeze hard the two microslides together and rub them together using your fingers. The motion should be along the axis shown in the image shown in FIG. 23, and the motion should be done 5 times while squeezing the slides together. This will break the capsules.

4—Bring the 2 microslides to the same distance as in step 1.

5—Remove the top microslide, and the bottom one containing the broken capsules can be smelled. Assess whether there is a difference in fragrance intensity against step 1 (scale: no=0, low=1, medium=2, high=3 and very high=4).

For example, if we wish to assess the core retention of 5 hypothetical and different capsule populations, we would have the following results:

|  | Panelist 1 | Panelist 2 | Panelist 3 | Panelist 4 | Panelist 5 | Panelist 6 | Panelist 7 | Panelist 8 | Panelist 9 | Panelist 10 | Average |
|---|---|---|---|---|---|---|---|---|---|---|---|
| Sample A | 4 | 2 | 4 | 4 | 2 | 2 | 3 | 2 | 2 | 4 | 2.9 |
| Sample B | 3 | 3 | 4 | 4 | 3 | 3 | 3 | 4 | 4 | 3 | 3.4 |
| Sample C | 1 | 1 | 1 | 1 | 2 | 2 | 1 | 1 | 1 | 2 | 1.3 |
| Sample D | 0 | 1 | 1 | 0 | 0 | 1 | 1 | 0 | 1 | 0 | 0.5 |
| Sample E | 0 | 1 | 0 | 0 | 0 | 0 | 1 | 0 | 1 | 0 | 0.3 |

Based on the hypothetical data form the above table, one can calculate the average intensity from the test, but also can test for statistical significance by a simple t-test.

The closer the average is to 4, the higher the core retention is, and the lower the shell permeability is.

Degree of Branching Method

The degree of branching of the precursors was determined as follows: Degree of branching is measured using (29Si) Nuclear Magnetic Resonance Spectroscopy (NMR).

Sample Preparation

Each sample is diluted to a 25% solution using deuterated benzene (Benzene-D6 "100%" (D, 99.96% available from Cambridge Isotope Laboratories Inc., Tewksbury, MA, or equivalent). 0.015M Chromium (III) acetylacetonate (99.99% purity, available from Sigma-Aldrich, St. Louis, MO, or equivalent) is added as a paramagnetic relaxation reagent. If glass NMR tubes (Wilmed-LabGlass, Vineland, NJ or equivalent) are used for analysis, a blank sample must also be prepared by filling an NMR tube with the same type of deuterated solvent used to dissolve the samples. The same glass tube must be used to analyze the blank and the sample.

Sample Analysis

The degree of branching is determined using a Bruker 400 MHz Nuclear Magnetic Resonance Spectroscopy (NMR) instrument, or equivalent. A standard silicon (29Si) method (e.g. from Bruker) is used with default parameter settings with a minimum of 1000 scans and a relaxation time of 30 seconds.

Sample Processing

The samples are stored and processed using system software appropriate for NMR spectroscopy such as MestReNova version 12.0.4-22023 (available from Mestrelab Research) or equivalent. Phase adjusting and background correction are applied. There is a large, broad, signal present that stretches from −70 to −136 ppm which is the result of using glass NMR tubes as well as glass present in the probe housing. This signal is suppressed by subtracting the spectra of the blank sample from the spectra of the synthesized sample provided that the same tube and the same method parameters are used to analyze the blank and the sample. To further account for any slight differences in data collection, tubes, etc., an area outside of the peaks of interest area should be integrated and normalized to a consistent value. For example, integrate −117 to −115 ppm and set the integration value to 4 for all blanks and samples.

The resulting spectra produces a maximum of five main peak areas. The first peak (Q0) corresponds to unreacted TAOS. The second set of peaks (Q1) corresponds to end groups. The next set of peaks (Q2) correspond to linear groups. The next set of broad peaks (Q3) are semi-dendritic units. The last set of broad peaks (Q4) are dendritic units. When PAOS and PBOS are analyzed, each group falls within a defined ppm range. Representative ranges are described in the following table A:

TABLE A

| Group ID | # of Bridging Oxygen per Silicon | ppm Range |
|---|---|---|
| Q0 | 0 | −80 to −84 |
| Q1 | 1 | −88 to −91 |
| Q2 | 2 | −93 to −98 |
| Q3 | 3 | −100 to −106 |
| Q4 | 4 | −108 to −115 |

Polymethoxysilane has a different chemical shift for Q0 and Q1, an overlapping signal for Q2, and an unchanged Q3 and Q4 as noted in the table B below:

TABLE B

| Group ID | # of Bridging Oxygen per Silicon | ppm Range |
| --- | --- | --- |
| Q0 | 0 | −78 to −80 |
| Q1 | 1 | −85 to −88 |
| Q2 | 2 | −91 to −96 |
| Q3 | 3 | −100 to −106 |
| Q4 | 4 | −108 to −115 |

The ppm ranges indicated in the tables above may not apply to all monomers. Other monomers may cause altered chemical shifts, however, proper assignment of Q0-Q4 should not be affected.

Using MestReNova, each group of peaks is integrated, and the degree of branching can be calculated by the following equation:

$$\text{Degree of Branching} = 1/4 \frac{3*Q3 + 4*Q4}{Q1 + Q2 + Q3 + Q4}.$$

Molecular Weight and Polydispersity Index Determination Method

The molecular weight (Polystyrene equivalent Weight Average Molecular Weight (Mw)) and polydispersity index (Mw/Mn) of the condensed layer precursors described herein are determined using Size Exclusion Chromatography with Refractive Index detection. Mn is the number average molecular weight.

Sample Preparation

Samples are weighed and then diluted with the solvent used in the instrument system to a targeted concentration of 10 mg/mL. For example, weigh 50 mg of polyalkoxysilane into a 5 mL volumetric flask, dissolve and dilute to volume with toluene. After the sample has dissolved in the solvent, it is passed through a 0.45 µm nylon filter and loaded into the instrument autosampler.

Sample Analysis

An HPLC system with autosampler (e.g. Waters 2695 HPLC Separation Module, Waters Corporation, Milford MA, or equivalent) connected to a refractive index detector (e.g. Wyatt 2414 refractive index detector, Santa Barbara, CA, or equivalent) is used for polymer analysis. Separation is performed on three columns, each 7.8 mm I.D.×300 mm in length, packed with 5 µm polystyrene-divinylbenzene media, connected in series, which have molecular weight cutoffs of 1, 10, and 60 kDA, respectively. Suitable columns are the TSKGel G1000HHR, G2000HHR, and G3000HHR columns (available from TOSOH Bioscience, King of Prussia, PA) or equivalent. A 6 mm I.D.×40 mm long 5 µm polystyrene-divinylbenzene guard column (e.g. TSKgel Guardcolumn HHR-L, TOSOH Bioscience, or equivalent) is used to protect the analytical columns. Toluene (HPLC grade or equivalent) is pumped isocratically at 1.0 mL/min, with both the column and detector maintained at 25° C. 100 µL of the prepared sample is injected for analysis. The sample data is stored and processed using software with GPC calculation capability (e.g. ASTRA Version 6.1.7.17 software, available from Wyatt Technologies, Santa Barbara, CA or equivalent.)

The system is calibrated using ten or more narrowly dispersed polystyrene standards (e.g. Standard ReadyCal Set, (e.g. Sigma Aldrich, PN 76552, or equivalent) that have known molecular weights, ranging from about 0.250-70 kDa and using a third order fit for the Mp verses Retention Time Curve.

Using the system software, calculate and report Weight Average Molecular Weight (Mw) and PolyDispersity Index (Mw/Mn).

Method of Calculating Organic Content in First Shell Component

Definition of organic moiety in inorganic shell-Any moiety X that cannot be cleaved from a metal precursor bearing a metal M (where M belongs to the group of metals and semi-metals, and X belongs to the group of non-metals) via hydrolysis of the M-X bond linking said moiety to the inorganic precursor of metal or semi-metal M and under specific reaction conditions, will be considered as organic. A minimal degree of hydrolysis of 1% when exposed to neutral pH distilled water for a duration of 24 h without stirring, is set as the reaction conditions.

This method allows one to calculate a theoretical organic content assuming full conversion of all hydrolysable groups. As such, it allows one to assess a theoretical percentage of organic for any mixture of silanes and the result is only indicative of this precursor mixture itself, not the actual organic content in the first shell component. Therefore, when a certain percentage of organic content for the first shell component is disclosed anywhere in this document, it is to be understood as containing any mixture of unhydrolyzed or pre-polymerized precursors that according to the below calculations give a theoretical organic content below the disclosed number.

Example for Silane (but not Limited to Silane, See Generic Formulas at the End of the Document):

Consider a mixture of silanes, with a molar fraction $Y_i$ for each, and where i is an ID number for each silane. Said mixture can be represented as follows:

$$Si(XR)_{4-n}R_n$$

Where XR is a hydrolysable group under conditions mentioned in the definition above, $R^i{}_{ni}$ is non-hydrolyzable under conditions mentioned above and $n_i$=0, 1, 2 or 3.

Such a mixture of silanes will lead to a shell with the following general formula:

$$SiO_{\frac{(4-n)}{2}}R_n$$

Then, the weight percentage of organic moieties as defined earlier can be calculated as follows:

1) Find out Molar fraction of each precursor
2) Determine general formula for each precursor
3) Calculate general formula of precursor mixture based on molar fractions
4) Transform into reacted silane (all hydrolysable groups to oxygen groups)
5) Calculate weight ratio of organic moieties vs. total mass (assuming 1 mole of Si for framework)

EXAMPLE

| Raw material | Formula | Mw (g/mol) | weight (g) | amount (mmol) | Molar fraction |
|---|---|---|---|---|---|
| Sample AY | SiO(OEt)$_2$ | 134 | 1 | 7.46 | 0.76 |
| TEOS | Si(OEt)$_4$ | 208 | 0.2 | 0.96 | 0.10 |
| DEDMS | Si(OEt)$_2$Me$_2$ | 148.27 | 0.2 | 1.35 | 0.14 |

To calculate the general formula for the mixture, each atoms index in the individual formulas is to be multiplied by their respective molar fractions. Then, for the mixture, a sum of the fractionated indexes is to be taken when similar ones occur (typically for ethoxy groups).

Note: Sum of all Si fractions will always add to 1 in the mixture general formula, by virtue of the calculation method (sum of all molar fractions for Si yields 1).

$$SiO_{1+0.76}(OEt)_{2*0.76+4*0.10+2*0.14}Me_{2*0.14}$$

$$SiO_{0.76}(OEt)_{2.2}Me_{0.28}$$

To transform the unreacted formula to a reacted one, simply dividing the index of ALL hydrolysable groups by 2, and then adding them together (with any pre-existing oxygen groups if applicable) to obtain the fully reacted silane $$SiO_{1.86}Me_{0.28}$$

In this case, the expected result is $SiO_{1.86}Me_{0.28}$, as the sum of all indexes must follow the following formula:

$$A+B/2=2,$$

where A is the oxygen atom index and B is the sum of all non-hydrolysable indexes. The small error occurs from rounding up during calculations and should be corrected. The index on the oxygen atom is then readjusted to satisfy this formula.

Therefore, the final formula is $SiO_{1.86}Me_{0.28}$, and the weight ratio of organic is calculated below:

Weight ratio:=(0.28*15)/(28+1.86*16+0.28*15)
=6.8%

General Case:

The above formulas can be generalized by considering the valency of the metal or semi-metal M, thus giving the following modified formulas:

$$M(XR)_{V-m}R^1_m$$

And using a similar method but considering the valency V for the respective metal.

EXAMPLES

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

Example 1: Non-Hydrolytic Precursor Synthesis

The Precursors for Samples A-S, AV-AAF were made by the following method:

A quantity of TAOS reagent(s) (available from Sigma Aldrich) were added to a clean dry round bottom flask equipped with a stir bar and distillation apparatus under nitrogen atmosphere. A volume of acetic anhydride (available from Sigma Aldrich) and catalyst (available from Gelest, Sigma Aldrich) were added and the contents of the flask were stirred and heated as indicated in the Table 1. The reaction was heated to the indicated temperature for the indicated amount of time, during which the organic ester generated by reaction of the alkoxy silane groups with acetic anhydride was distilled off along with additional organic esters generated by the condensation of silyl-acetate groups with other alkoxysilane groups occurred the which as polyalkoxysilane (PAOS) was generated. The reaction flask was cooled to room temperature and placed on a rotary evaporator (Buchi Rotovapor R110), used in conjunction with a water bath and vacuum pump (Welch 1402 DuoSeal) to remove any remaining solvent. All reactant and reagent types and ratios, catalysts and ratios, and all reaction conditions (e.g. time and temperature) are detailed in Table 1.

The following reactants can be abbreviated as follows: tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), tetraacetoxysilane (TAcS), and titanium tetrabutoxide (TTB).

Example 2: Hydrolytic Precursor Synthesis

The Precursors for Samples U-Z, AA-AI, and AK-AAB were made by the following method:

A quantity of TAOS reagent(s) (available from Sigma Aldrich) was added to a clean dry round bottom flask equipped with a stir bar and distillation apparatus under nitrogen atmosphere and to which was added a quantity of alcohol (available from Sigma Aldrich). A quantity of catalyst dissolved in water was added as indicated in the Table 2. 1N and 0.1N HCl dissolved in water are available from Sigma Aldrich. 0.002N HCl was prepared by diluting 0.1N HCl in distilled water (available from Sigma Aldrich). The reaction was stirred and heated to the indicated temperature for the indicated amount of time during which the alcohol generated by hydrolysis of the alkoxy silane groups and the alcohol solvent were both distilled off along with some of the water generated by the condensation of silanol groups which occurred as the polyalkoxysilane (PAOS) is generated. The reaction flask is cooled to room temperature and placed on a rotary evaporator (Buchi Rotovapor R110), used in conjunction with a water bath and vacuum pump (Welch 1402 DuoSeal) to remove any remaining solvent. All reactant and reagent types and ratios, catalysts and ratios, and all reaction conditions (e.g. time and temperature) are detailed in Table 2.

In some samples, such as Samples AB and AC, further reaction was needed, identified as Step 2 in Table 2 below. In Step 2, the procedure as described above was repeated except with the product from the above described reaction as the starting material. All reactant and reagent types and ratios, catalysts and ratios, and all reaction conditions (e.g. time and temperature) are detailed in Table 2.

TABLE 1

| | | | | | | | | | | |
|---|---|---|---|---|---|---|---|---|---|---|
| Non-Hydrolytic Synthesis | | | | | | | | | | |
| Precursor ID | TAOS amount and ID | Reagent | Mole Ratio Reagent/ TAOS | Catalyst | Mole Ratio Catalyst/ TAOS | Temp. Profile | Physical Appearance | Degree of Branching | Mw*** | PDI |
| A | 50 g TMOS | Acetic Anhydride | 1 | Tetrakis(trimethyl-siloxy)titanium | 0.3% | 50° C. for 1 hour then ramp to 100° C. for 1 hour | Sand | n/a* | n/a* | n/a* |
| B | 50 g TEOS | Acetic Anhydride | 1 | Titanium Ethoxide | 0.3% | 135° C. for 8 hours | Liquid | 0.18 | 1 | 1.7 |
| C | 50 g TEOS | Acetic Anhydride | 0.8 | Titanium Butoxide | 0.3% | 135° C. for 8 hours | Liquid | 0.22 | 1.6 | 1.7 |
| D | 50 g TEOS | Acetic Anhydride | 1 | Titanium Butoxide | 0.3% | 135° C. for 8 hours | Viscous Liquid | 0.27 | 3.3 | 2.9 |
| E | 50 g TEOS | Acetic Anhydride | 1 | Titanium Butoxide | 0.15% | 135° C. for 8 hours | Viscous Liquid | 0.26 | 3.9 | 3.7 |
| F | 50 g TEOS | Acetic Anhydride | 1.2 | Titanium Butoxide | 0.3% | 135° C. for 8 hours | Viscous Liquid | 0.30 | 7.2 | 4.6 |
| G | 50 g TEOS | Acetic Anhydride | 0.7 | Tetrakis(trimethyl-siloxy)titanium | 0.3% | 135° C. for 8 hours | Liquid | 0.14 | 0.5 | 2.2 |
| H | 50 g TEOS | Acetic Anhydride | 0.8 | Tetrakis(trimethyl-siloxy)titanium | 0.3% | 135° C. for 8 hours | Liquid | 0.10 | 1.1 | 1.2 |
| I | 50 g TEOS | Acetic Anhydride | 0.9 | Tetrakis(trimethyl-siloxy)titanium | 0.3% | 135° C. for 8 hours | Liquid | 0.20 | 0.9 | 2.5 |
| J | 50 g TEOS | Acetic Anhydride | 1 | Tetrakis(trimethyl-siloxy)titanium | 0.3% | 135° C. for 24 hours | Viscous Liquid | 0.26 | 2.3** | 2.1** |
| K | 50 g TEOS | Acetic Anhydride | 1.2 | Tetrakis(trimethyl-siloxy)titanium | 0.3% | 135° C. for 24 hours | Viscous Liquid | 0.39 | 3.7 | 5.6 |
| L | 50 g TEOS/ 37.2 g TMOS | Acetic Anhydride | 1:1:2 (TEOS:TMOS:AA) | Tetrakis(trimethyl-siloxy)titanium | 0.3% | 70° C. for 1 hour then ramp to 120° C. for 2 hours | Soft Gel Balls | n/a* | n/a* | n/a* |
| M | 50 g TBOS | Acetic Anhydride | 1 | Tetrakis(trimethyl-siloxy)titanium | 0.3% | 130° C. for 1 hour then ramp to 180° C. for 24 hours | Viscous Liquid | 0.31 | 1.7 | 1.3 |
| N | 50 g TBOS | Acetic Anhydride | 1.2 | Tetrakis(trimethyl-siloxy)titanium | 0.3% | 130° C. for 1 hour then ramp to 180° C. for 24 hours | Viscous Liquid | 0.47 | 2.5 | 1.4 |
| O | 50 g TEOS/ 5 g TEMS | Acetic Anhydride | 1 | Tetrakis(trimethyl-siloxy)titanium | 0.3% | 135° C. for 24 hours | Liquid | 0.20 | 0.9 | 3.1 |
| P | 50 g TEOS/ 5 g DEDMS | Acetic Anhydride | 1 | Tetrakis(trimethyl-siloxy)titanium | 0.3% | 135° C. for 24 hours | Viscous Liquid | 0.26 | 1.2 | 3.1 |
| R | 50 g TEOS/ 2 g TMES | Acetic Anhydride | 1 | Tetrakis(trimethyl-siloxy)titanium | 0.3% | 135° C. for 24 hours | Viscous Liquid | 0.26 | 1.3 | 3.0 |
| S | 50 g TEOS/ 10 g TTB | Acetic Anhydride | 1 | None | n/a | 135° C. for 24 hours | Viscous Liquid | 0.24 | 0.9 | 3.2 |

TABLE 1-continued

Non-Hydrolytic Synthesis

| Precursor ID | TAOS amount and ID | Reagent | Mole Ratio Reagent/ TAOS | Catalyst | Mole Ratio Catalyst/ TAOS | Temp. Profile | Physical Appearance | Degree of Branching | Mw*** | PDI |
|---|---|---|---|---|---|---|---|---|---|---|
| AV | 50 g TEOS/ 20 g TTB | Acetic Anhydride | 1 | None | n/a | 135° C. for 24 hours | Viscous Liquid | 0.27 | 1.4 | 2.4 |
| AWchange | 75 g TEOS | Acetic Anhydride | 1 | Tetrakis(trimethyl-siloxy)titanium | 0.3% | 135° C. for 7 hours | Viscous Liquid | 0.25 | 1.8 | 2.0 |
| AX | 1,000 g TEOS | Acetic Anhydride | 1 | Tetrakis(trimethyl-siloxy)titanium | 0.3% | 135° C. for 28 hours | Viscous Liquid | 0.26 | 1.2 | 3.9 |
| AY | 200 g TEOS | Acetic Anhydride | 1 | Tetrakis(trimethyl-siloxy)titanium | 0.3% | 135° C. for 24 hours | Viscous Liquid | 0.25 | 1.3 | 3.9 |
| AZ | 350 g TEOS | Acetic Anhydride | 1.1 | Tetrakis(trimethyl-siloxy)titanium | 0.3% | 135° C. for 30 hours | Viscous Liquid | 0.29 | 1.5 | 4.9 |
| AAA | 750 g TEOS | Acetic Anhydride | 1 | Tetrakis(trimethyl-siloxy)titanium | 0.3% | 135° C. for 24 hours | Viscous Liquid | 0.26 | 1.4 | 1.8 |
| AAC | 150 g TEOS | Acetic Anhydride | 1.2 | Titanium Tetraethoxide | 0.3% | 135° C. for 24 hours | Viscous Liquid | 0.36 | 3.8 | 7.4 |
| AAD | 200 g TEOS | Acetic Anhydride | 1.2 | Tetrakis(trimethyl-siloxy)titanium | 0.3% | 135° C. for 60 hours | Viscous Liquid | 0.43 | 10 | 6.6 |
| AAE | 100 g TEOS | Acetic Anhydride | 1 | Titanium Butoxide | 0.3% | 135° C. for 20 hours | Viscous Liquid | 0.25 | 1.3 | 3.0 |
| AAF | 750 g TEOS | Acetic Anhydride | 1 | Tetrakis(trimethyl-siloxy)titanium | 0.3% | 135° C. for 24 hours | Viscous Liquid | 0.21 | 0.9 | 3.5 |
| AAG | 395 g TEOS | Acetic Anhydride | 1.1 | Tetrakis(trimethyl-siloxy)titanium | 0.3% | 135° C. for 30 hours | Viscous Liquid | 0.30 | 1.6 | 1.8 |
| AAH | 50 g TEOS | Acetic Anhydride | 0.9 | Tetrakis(trimethyl-siloxy)titanium | 0.3% | 135° C. for 16 hours | Viscous Liquid | 0.24 | 1.1 | 2.2 |
| AAI | 50 g TEOS | Acetic Anhydride | 1.2 | Tetrakis(trimethyl-siloxy)titanium | 0.3% | 135° C. for 32 hours | Viscous Liquid | 0.39 | 4.3 | 8.6 |
| AAJ | | Acetic Anhydride | 1 | Tetrakis(trimethyl-siloxy)titanium | 0.3% | 135° C. for 22 hours | Viscous Liquid | 0.29 | 2.4 | 6.9 |
| AAK | 200 g TEOS | Acetic Anhydride | | Titanium Butoxide | 0.3% | 135° C. for 22 hours | Viscous Liquid | 0.37 | 6.0 | 4.8 |
| AAL | 50 g TEOS | Acetic Anhydride | 1.2 | Tetrakis(trimethyl-siloxy)titanium | 0.3% | 135° C. for 12 hours | Viscous Liquid | 0.38 | 5.6 | 9.3 |
| AAM | 50 g TEOS | Acetic Anhydride | 1.2 | Tetrakis(trimethyl-siloxy)titanium | 0.3% | 135° C. for 8 hours | Viscous Liquid | 0.36 | 8.3 | 8.3 |
| AAN | 900 g TEOS | Acetic Anhydride | 1 | Tetrakis(trimethyl-siloxy)titanium | 0.3% | 135° C. for 24 hours | Viscous Liquid | 0.27 | 1.3 | 1.7 |

*Samples past gel point. Characterization data not available,
**Results are an average of three synthesized materials
***Polystyrene equivalent Weight Average Molecular Weight calculated as described above

TABLE 2

Hydrolytic Synthesis

| Precursor ID | TAOS amount and ID | Reagent/ Catalyst | Mole Ratio Reagent/ Catalyst/ TAOS | Solvent Amount and ID | Temp. Profile | Step 2 Reagent/ Catalyst |
|---|---|---|---|---|---|---|
| U | 50 g TMOS | H$_2$O/0.1N HCl | 0.5/0.00216/1 | 65 mL MeOH | 70° C. for 1 hour then ramp to 115° C.for 7 hours | — |
| V | 50 g TMOS | H$_2$O/0.1N HCl | 1/0.00433/1 | 65 mL MeOH | 70° C. for 1 hour, ramp to 115° C. for 7 hrs, then reduce back to 70° C. for 16 hours | — |
| W | 50 g TMOS | H$_2$O/0.1N HCl | 1.25/0.00541/1 | 65 mL MeOH | 70° C. for 1 hour then ramp to 115° C.for 7 hours | — |
| X | 50 g TMOS | H$_2$O/0.1N HCl | 1.5/0.00650/1 | 65 mL MeOH | 70° C. for 1 hour then ramp to 115° C.for 7 hours | — |

TABLE 2-continued

| | | Hydrolytic Synthesis | | | | |
|---|---|---|---|---|---|---|
| Y | 50 g TEOS | $H_2O$/0.1N HCl | 0.61/0.00264/1 | 60 mL EtOH | 80° C. for 1 hour, ramp to 120° C. for 7, then reduce back to 80° C. for 60 hours | — |
| Z | 50 g TEOS | $H_2O$/0.1N HCl | 1/0.00433/1 | 60 mL EtOH | 80° C. for 1 hour then ramp to 120° C. for 24 hours | — |
| AA | 50 g TEOS | $H_2O$/1.0N HCl | 0.61/0.0264/1 | 60 mL EtOH | 80° C. for 1 hour then ramp to 120° C. for 7 hours | — |
| AB | 50 g TEOS | $H_2O$/1.0N HCl | 0.5/0.0287/1 | 60 mL EtOH | 80° C. for 1 hour then ramp to 120° C. for 7 hours | $H_2O$/1.0N HCl |
| AC | 50 g TEOS | $H_2O$/0.002N HCl | $0.5/4.33^{E-5}/1$ | 60 mL EtOH | 80° C. for 1 hour then ramp to 120° C. for 7 hours | $H_2O$/0.002N HCl |
| AD | 50 g TEOS | $H_2O$/Acetic Acid | 1/1/1 | 50 mL EtOH | 80° C. for 1 hour then ramp to 120° C. for 24 hours | — |
| AE | 50 g TEOS | $H_2O$/Acetic Acid | 1.5/1.5/1 | 50 mL EtOH | 80° C. for 1 hour then ramp to 120° C. for 24 hours | — |
| AF | 50 g TEOS | $H_2O$/0.1N HCl | 1/0.00433/1 | 60 mL MeOH | 65° C. for 1 hour then ramp to 100° for 7 hours | — |
| AG | 50 g TEOS/ 50 g STC | $H_2O$ | 1/0/1 | 62 mL EtOH | 80° C. for 1 hour then ramp to 120° C. for 24 hours | — |
| AH | 50 g TEOS/ 0.5 g TEMS | $H_2O$/0.1N HCl | 1/0.00433/1 | 56 mL EtOH | 80° C. for 1 hour then ramp to 120° C. for 24 hours | — |
| AI | 50 g TEOS/ 5 g TEMS | $H_2O$/0.1N HCl | 1/0.00433/1 | 62 mL EtOH | 80° C. for 1 hour then ramp to 120° C. for 24 hours | — |
| AK | 50 g TBOS | $H_2O$/0.1N HCl | 0.8/0.00433/1 | 45 mL EtOH | 80° C. for 1 hour then ramp to 180° C. for 65 hours | — |
| AL | 50 g TBOS | $H_2O$/0.1N HCl | 1/0.00433/1 | 45 mL EtOH | 80° C. for 1 hour then ramp to 180° C. for 65 hours | — |
| AM | 50 g TEOS | Formic Acid | 1.2/0/1 | n/a | 80° C. for 1 hour then ramp to 120° C. for 24 hours | — |
| AN | 50 g TEOS | $H_2O$/Formic Acid | 1/1/1 | 70 mL EtOH | 80° C. for 1 hour then ramp to 120° C. for 6 hours | — |
| AO | 50 g TEOS | $H_2O$/Trifluoro Acetic Acid | 1/0.5/1 | 70 mL EtOH | 80° C. for 1 hour then ramp to 120° C. for 24 hours | — |
| AP | 45 g TEOS/ 5 g TAcS | $H_2O$ | 1/0.00433/1 | 62 mL EtOH | 80° C. for 1 hour then ramp to 120° C. for 24 hours | — |
| AQ | 45 g TEOS/ 5 g TEMS | $H_2O$/0.1N HCl | 1/0.00433/1 | 56 mL EtOH | 80° C. for 1 hour then ramp to 120° C. for 24 hours | — |
| AR | 45 g TEOS/ 5 g DEDMS | $H_2O$/0.1N HCl | 1/0.00433/1 | 58 mL EtOH | 80° C. for 1 hour then ramp to 120° C. for 24 hours | — |

TABLE 2-continued

| | | | Hydrolytic Synthesis | | | | |
|---|---|---|---|---|---|---|---|
| AS | 48 g TEOS/ 2 g TMES | H₂O/0.1N HCl | 1/0.00433/1 | 55 mL EtOH | 80° C. for 1 hour then ramp to 120° C. for 24 hours | — | |
| AT | 90 g TEOS/ 8 g TEMS/ 2 g TMES | H₂O/0.1N HCl | 1/0.00433/1 | 114 mL EtOH | 80° C. for 1 hour then ramp to 120° C. for 24 hours | — | |
| AU | 50 g TEOS/ 10 g TTB | H₂O/0.1N HCl | 1/0.00433/1 | 60 mL EtOH | 80° C. for 1 hour then ramp to 120° C. for 24 hours | — | |
| AAB | 20 g TEOS | Glacial Acetic Acid | 2/0/1 | 0 mL | 80° C. for 1 hour then ramp to 120° C. for 24 hours | — | |

| Precursor ID | Additional Moles Reagent/ Catalyst Added | Solvent | Temp. Profile Step 2 | Physical Appearance | Degree of Branching | MW (kDa) | PDI |
|---|---|---|---|---|---|---|---|
| U | — | — | — | Liquid | 0.07 | <LOD | — |
| V | — | — | — | Liquid | 0.21 | 0.1 | 4.4 |
| W | — | — | — | Viscous Liquid | 0.30 | 3.3 | 1.3 |
| X | — | — | — | Gel | n/a* | n/a* | n/a* |
| Y | — | — | — | Liquid | 0.20 | 1.4 | 1.3 |
| Z | — | — | — | Liquid | 0.11 | 0.6 | 1.2 |
| AA | — | — | — | Liquid | 0.14 | 0.7 | 1.1 |
| AB | 0.11/0.0835 | 60 mL EtOH | 80° C. for 1 hour then ramp to 120° C. for 7 hours | Liquid | 0.21 | <LOD | — |
| AC | 0.11/9.5$^{E-6}$ | 60 mL EtOH | 80° C. for 1 hour then ramp to 120° C. for 7 hours | Viscous Liquid | 0.25 | 3.7 | 2.8 |
| AD | — | — | — | Viscous Liquid | 0.32 | 3.5 | 1.7 |
| AE | — | — | — | Sand | n/a* | n/a* | n/a* |
| AF | — | — | — | Liquid | 0.13 | 0.4 | 1.6 |
| AG | — | — | — | Viscous Liquid | 0.27 | 0.6 | 1.3 |
| AH | — | — | — | Liquid | 0.20 | 0.6 | 1.4 |
| AI | — | — | — | Liquid | 0.11 | 0.7 | 1.4 |
| AK | — | — | — | Liquid | 0.11 | 0.7 | 1.2 |
| AL | — | — | — | Liquid | 0.15 | 0.9 | 1.4 |
| AM | — | — | — | Viscous Liquid | 0.27 | 0.9 | 7.1 |
| AN | — | — | — | Gelled | n/a* | n/a* | n/a* |
| AO | — | — | — | Liquid | 0.15 | 0.9 | 2.9 |
| AP | — | — | — | Viscous Liquid | 0.21 | 0.9 | 1.6 |
| AQ | — | — | — | Liquid | 0.11 | 0.5 | 1.3 |
| AR | — | — | — | Liquid | 0.10 | 0.5 | 1.3 |
| AS | — | — | — | Liquid | 0.10 | 0.6 | 1.4 |
| AT | — | — | — | Viscous Liquid | 0.23 | 0.8 | 1.5 |
| AU | — | — | — | Viscous Liquid | 0.26 | 1.1 | 3.1 |
| AAB | — | — | — | Liquid | 0.16 | 0.6 | 2.3 |

*Samples past gel point. Characterization data not available

Example 3: Oil-In-Water Capsules

Capsules of Samples A, B, C, D was made by the following method:

The oil phase was prepared by mixing and homogenizing (or even dissolving if all compounds are miscible) a precursor, a benefit agent and/or a core modifier and a silane coupling agent. The water phase was prepared by dissolving a polymer as polymeric emulsifier into deionized water. Once each phase was prepared separately, they were mixed together, and the oil phase was dispersed into the water phase with an overhead mixer at 1100 rpm for 10 minutes to reach a desired mean capsule diameter of the capsules. Once the emulsification step was complete, the resulting emulsion was left resting without stirring for 4 hours at room temperature next 16 hours at 50° C. and finally 4 days at 70° C. until enough curing had occurred for the capsules to not collapse. In order to deposit a second shell component, the capsules received a post-treatment with a second shell component solution.

To test whether capsules collapse, the slurry must be at least 10 times diluted into de-ionized water. Drops of the subsequent dilution were added onto a microscopy microslide and left to dry overnight at room temperature. The following day the dried capsules were observed under an optical microscope by light transmission to assess if the capsules have retained their spherical shape (without the use of a cover slide)

All reagent types and ratios, and all reaction conditions are detailed in Table 3 and the results are detailed in Table 4.

Figure 2A:
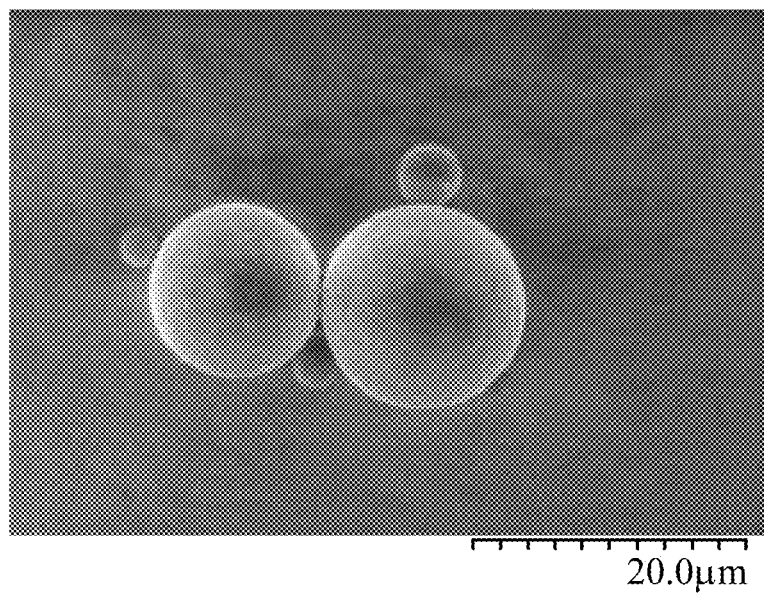
FIGS. 2A, 2B and 2C are scanning electron microscopy images of capsules of Example 3 in accordance with embodiments of the disclosure.
Figure 2B:
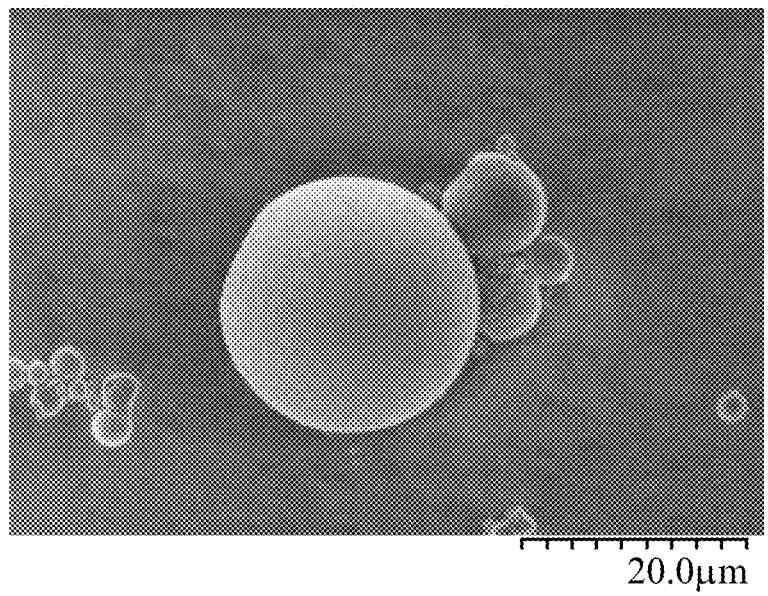
Figure 2C:
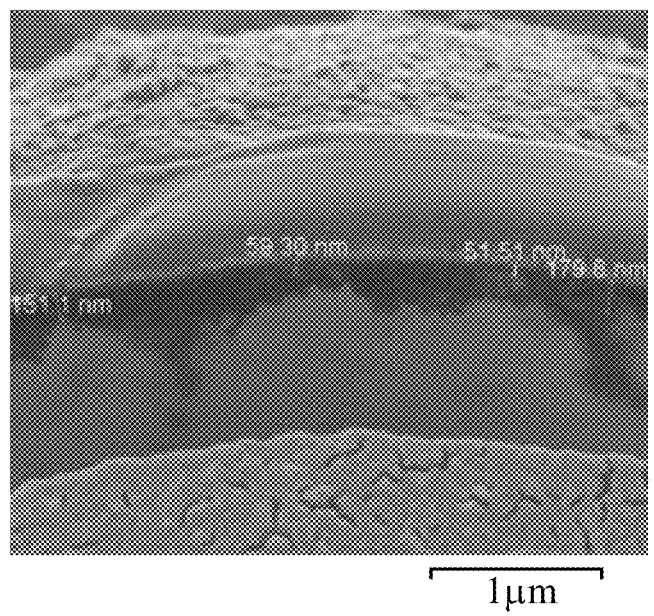
Figure 3A:
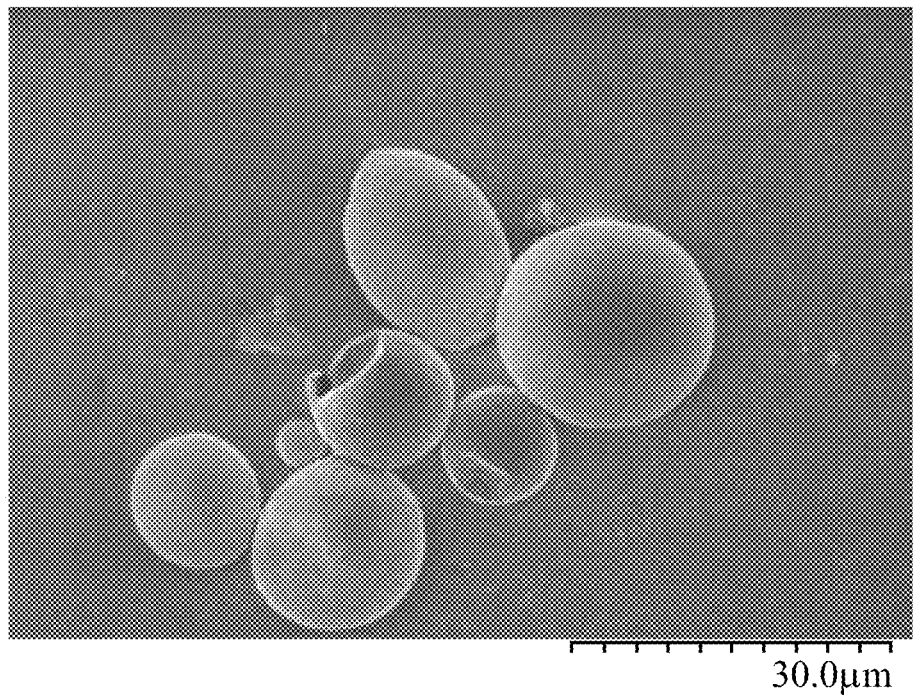
FIGS. 3A and 3B are scanning electron microscopy images of capsules of Example 3 in accordance with embodiments of the disclosure.
Figure 3B:
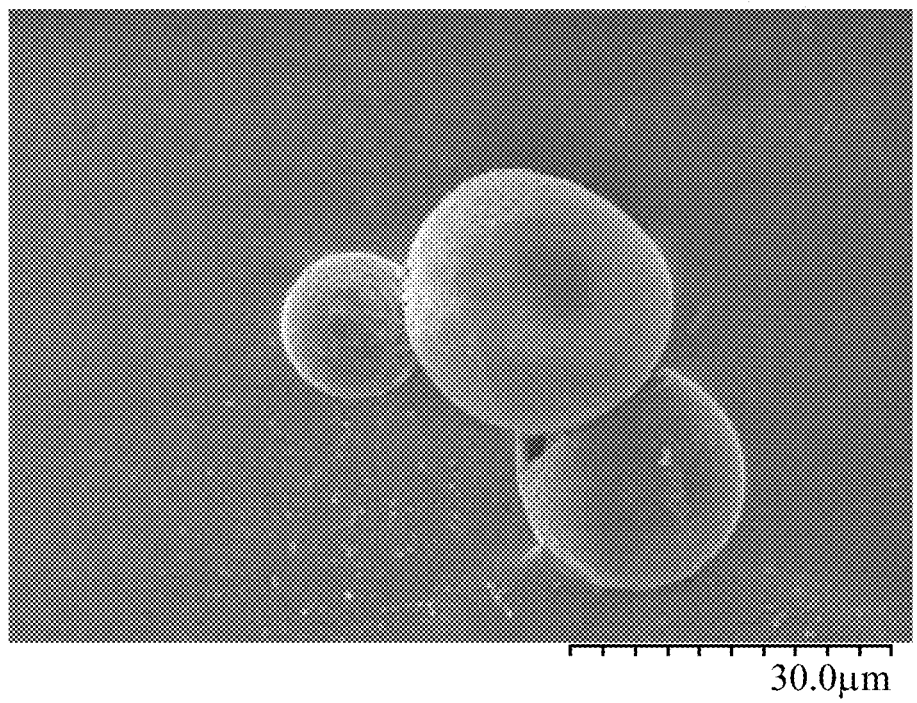
Figure 4A:
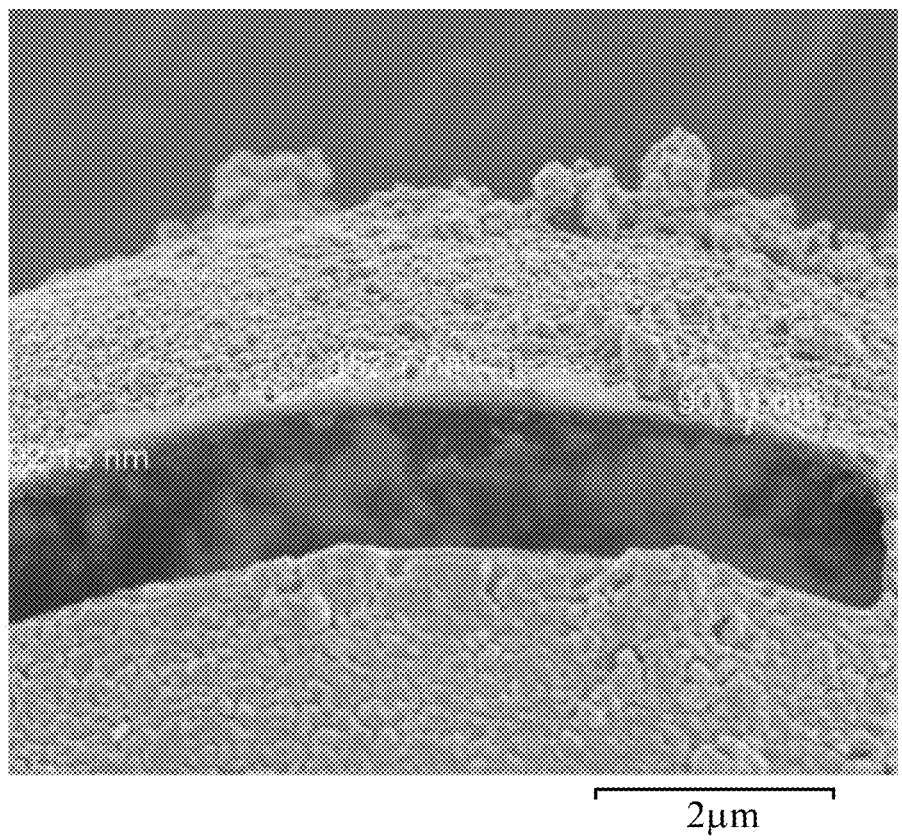
FIGS. 4A, 4B and 4C are scanning electron microscopy images of capsules of Example 3 in accordance with embodiments of the disclosure.
Figure 4B:
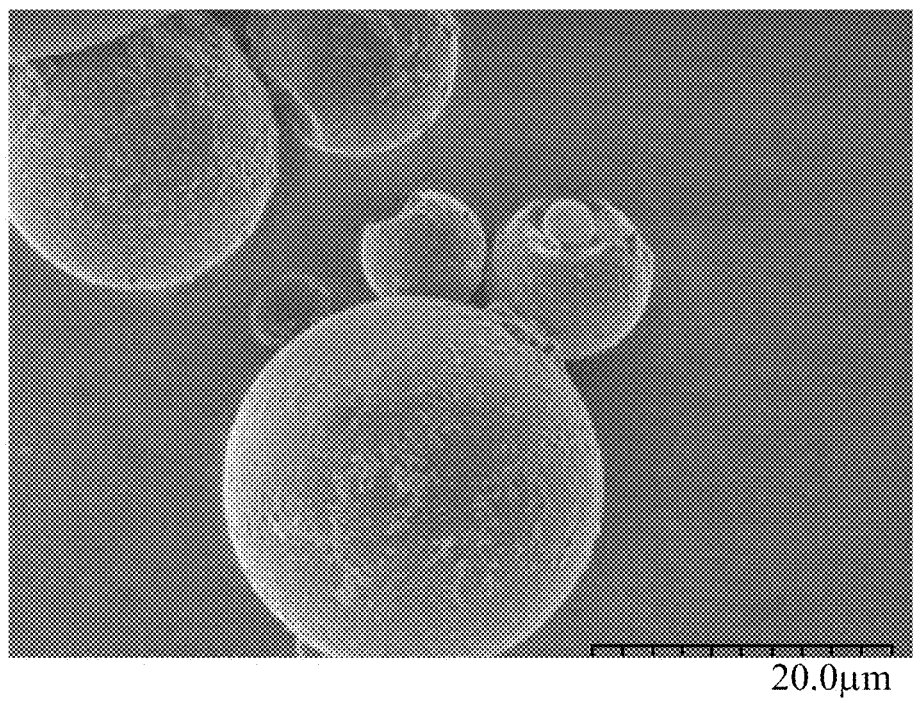
Figure 4C:
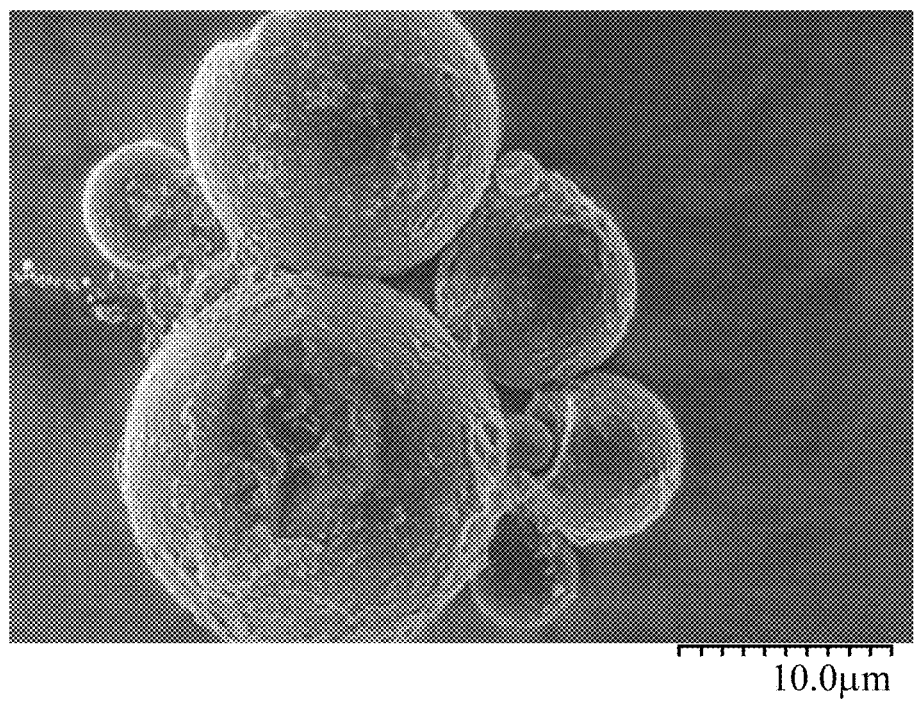
Figure 5A:
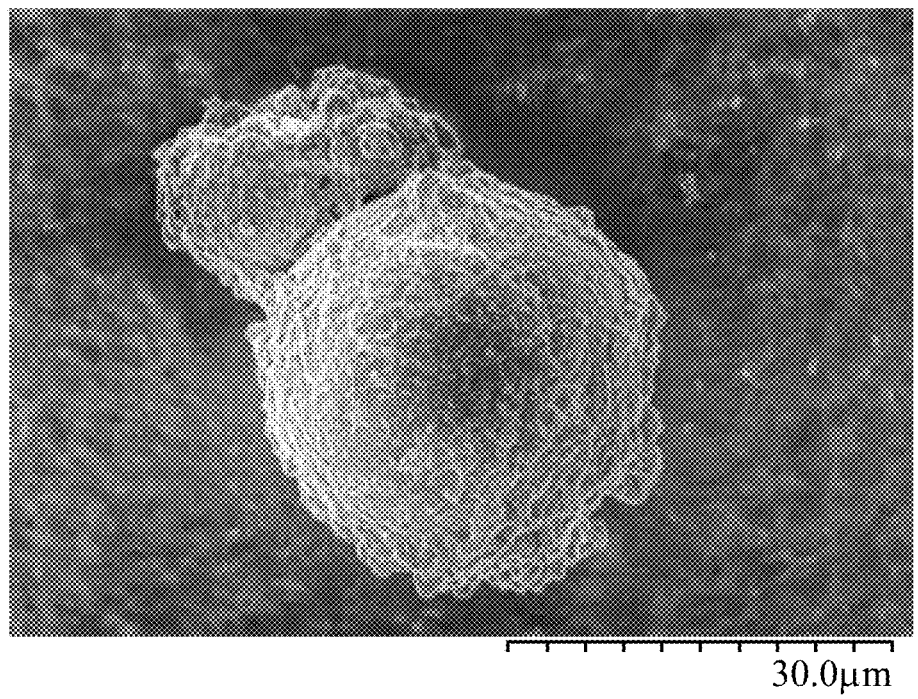
FIGS. 5A and 5B are scanning electron microscopy images of capsules of Example 3 in accordance with embodiments of the disclosure.
Figure 5B:
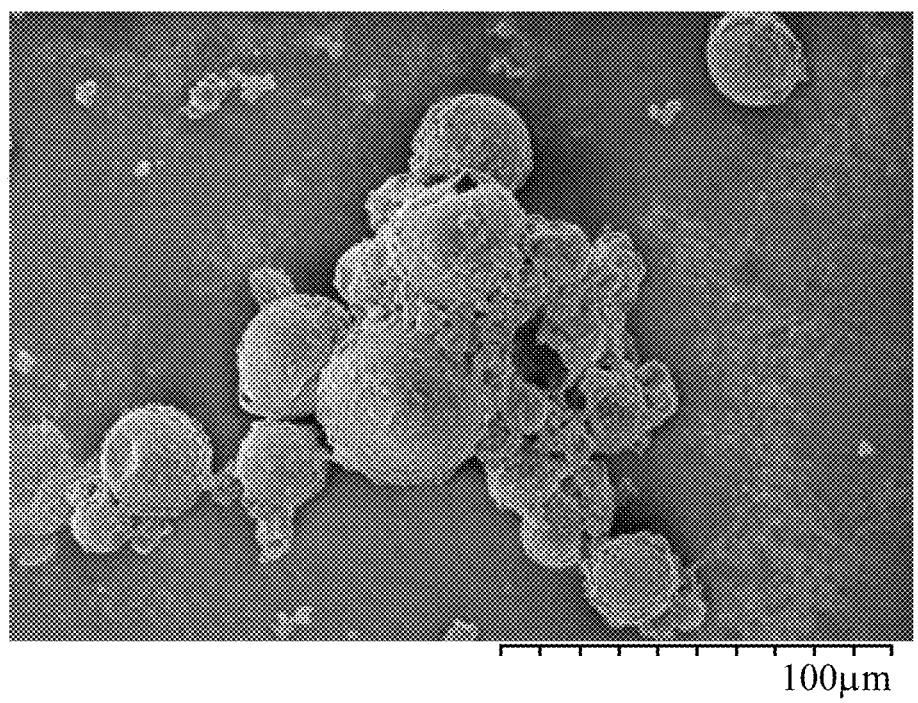

FIGS. 2A and 2B illustrate a capsule of Sample A and FIG. 2C illustrate a capsule shell of Sample A, of table 3 and 4. FIGS. 3A and 3B illustrates a capsule of Sample B, of the table 3 and 4. FIG. 4A illustrate a capsules shell of the Sample C and FIGS. 4B and 4C illustrates a capsule of Sample C, of the table 3 and 4. FIGS. 5A and 5B illustrate a capsules of Samples D, of the table 3 and 4.

Conditions Referenced in Table 3 a. 5 g of slurry was diluted in 17 g of 0.1M HCl solution, the pH is put at 7 using NaOH 4M dropwise. Then the solution is treated with a controlled addition (20 µl per minute) of the second shell component precursor solution, using a suspended magnetic stirrer reactor at 400 RPM. The pH was maintained at 7 using 1.6M HCl solution. The capsules were centrifuged per minutes at 2500 rpm and re-dispersed in 5 ml of DI water.

b. 5 g of slurry was washed with 10 g DI water, centrifuged for 10 minutes at 1500 rpm and separating the supernatant, 2 times. The capsules are dispersed in 5 ml of water then diluted in 17 g of 0.1M HCl solution, the pH is put at 7 using NaOH 4M dropwise. Then the solution is treated with a controlled addition (10 µl per minute) of the second shell component precursor solution, using a suspended magnetic stirrer reactor at 300 RPM. The pH was maintained at 7 using 1.6M HCl solution. The capsules were centrifuged per 10 minutes at 2500 rpm and re-dispersed in 5 ml of DI water.

c. The pH of 20 g of slurry is put at 7 using NaOH 4M dropwise. Then the slurry is treated with a controlled addition (20 µl per minute) of the second shell component precursor solution, using a suspended magnetic stirrer reactor at 200 RPM. The pH was maintained at 7 using 1.6M HCl solution.

TABLE 3

| | | | Capsule making | | | |
|---|---|---|---|---|---|---|
| Sample ID | Emulsion | Oil phase | Precursor type (ID from (Tables 1-4) | Silane coupling phase | Water phase | Coating material and amount |
| A | Oil in water | 7.8 g fragrance oil, 0.2 g silane coupling agent and 2 g precursor | AX | 3-Aminopropyltriethoxysilane | 40 g of a 5.0 wt % Selvol 540 solution | 2 ml of 10 w % of Sodium silicate(aq.) solution. Conditions a |
| B | Oil in water | 7.9 g fragrance oil, 0.1 g silane coupling agent and 2 g precursor | AAE | 3-Aminopropyltriethoxysilane | 40 g of a 2.0 w % Zemac E400 solution | 2 ml of 10 w % of Sodium silicate(aq.) solution. Conditions b |
| C | Oil in water | 7.9 g fragrance oil, 0.1 g silane coupling agent and 2 g precursor | AAF | 3-Aminopropyltriethoxysilane | 40 g of a 1.5 w % Zemac E400 solution | 1.3 ml of 10 w % of Sodium silicate(aq.) solution. Conditions c |
| D | Oil in water | 7.9 g fragrance oil, 0.1 g silane coupling agent and 2 g precursor | AAF | 3-Aminopropyltriethoxysilane | 40 g of a 1.5 w % Zemac E400 solution | 4 ml of 10 w % of Sodium silicate(aq.) solution. Conditions c |

TABLE 4

Examples results

| Sample ID | Mean Diameter (um) | CoV PSD (%) | Mean Shell Thickness (nm) | Thickness to Diameter ratio (%) | Effective core to shell ratio | Shell % inorganic | Survive drying |
|---|---|---|---|---|---|---|---|
| A | 14.9 | 33.9 | 122.5 | 0.8 | 95:5 | 100% | Yes |
| B | 26.2 | 40.2 | — | — | — | 100% | Yes |
| C | 29.0 | 44.1 | 91.7 | 0.3 | 97:3 | 100% | Yes |
| D | 54.5 | 50.8 | — | — | — | 100% | Yes |

Example 4: Oil-in-Water Capsules

Capsules of Samples E, F, G, H, I, J, K, L, M, N, O, P, Q, R was made by the following method:

The oil phase was prepared by mixing and homogenizing (or even dissolving if all compounds are miscible) 2 g of a precursor with a benefit agent and/or a core modifier, here 3.2 g of a fragrance oil, 4.8 g of Isopropyl myristate and finally 0.1 g of 3-Aminopropyltriethoxysilane. The water phase was prepared by dissolving 1.4 g of copolymer of ethylene and maleic anhydride (Zemac E400 from Vertellus) as polymeric emulsifier into 38.6 g of 0.1M HCl solution. The final pH of the water phase was 1.9.

Once each phase was prepared separately, they were mixed together, and the oil phase was dispersed into the water phase with an overhead mixer at 1100 rpm for 10 minutes to reach a desired mean capsule diameter of the capsules. Once the emulsification step was complete, the resulting emulsion was left resting without stirring for 4 hours at room temperature next 16 hours at 50° C. and finally 4 days at 70° C. until enough curing had occurred for the capsules to not collapse.

All precursor types and ratios are detailed in Table 5.

Example 5: Mineralization

Capsules of Samples U, V, W, X, Y, Z, AA, AB, AC, AD, AE, AF, AG, AH was made by the following method:
To deposit a second shell component, capsule samples from Example 4 received a treatment with a second shell component solution. The pH of 20 g of slurry is put at 7 using NaOH 4M dropwise. Then the slurry is treated with a controlled addition (20 µl per minute) of 2 ml of 10 w % of Sodium silicate (aq.) solution, using a suspended magnetic stirrer reactor at 200 RPM. The pH was maintained at 7 using 1.6M HCl solution To test whether capsules collapse, the slurry must be at least 10 times diluted into deionized water. Drops of the subsequent dilution were added onto a microscopy microslide and left to dry overnight at room temperature. The following day the dried capsules were observed under an optical microscope by light transmission to assess if the capsules have retained their spherical shape (without the use of a cover slide)

Concordance between samples from Example 4 used to make samples of Example 5 are detailed in table 7. Results are detailed in Table 6.

Figure 6A:
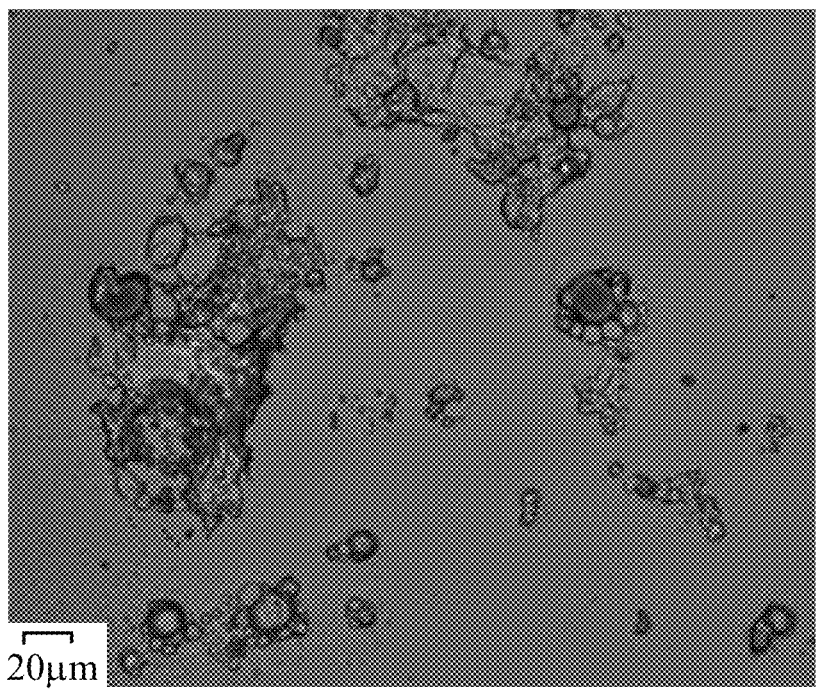
FIGS. 6A and 6B are respectively optical microscopy and scanning electron microscopy images of capsules of Example 4 in accordance with embodiments of the disclosure.
Figure 6B:
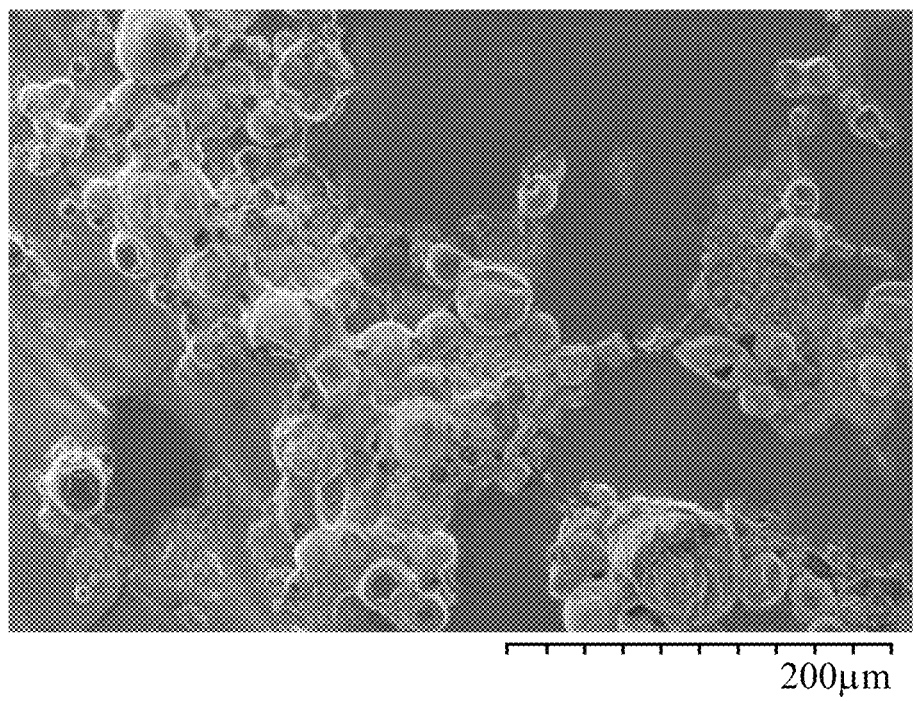
Figure 7:
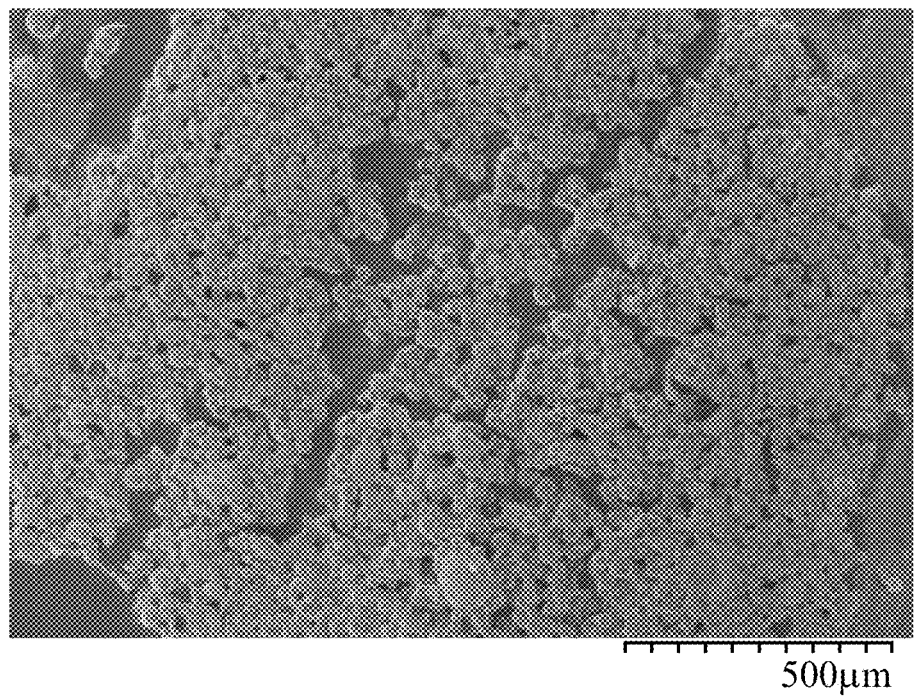
FIG. 7 is a scanning electron microscopy image of capsules of Example 4 in accordance with embodiments of the disclosure.
Figure 8:
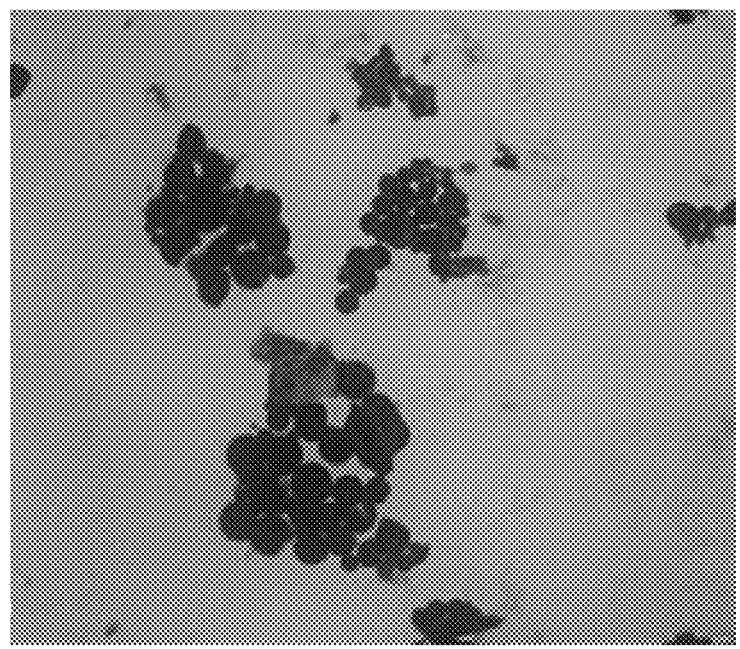
FIG. 8 is an optical microscopy image of capsules of Example 4 in accordance with embodiments of the disclosure.
Figure 9:
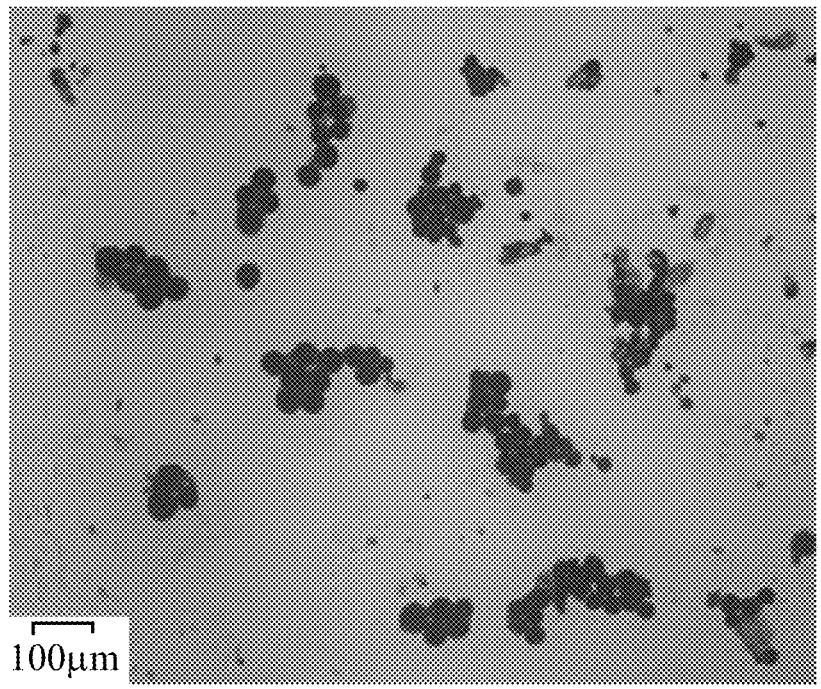
FIG. 9 is an optical microscopy image of capsules of Example 4 in accordance with embodiments of the disclosure.
Figure 10:
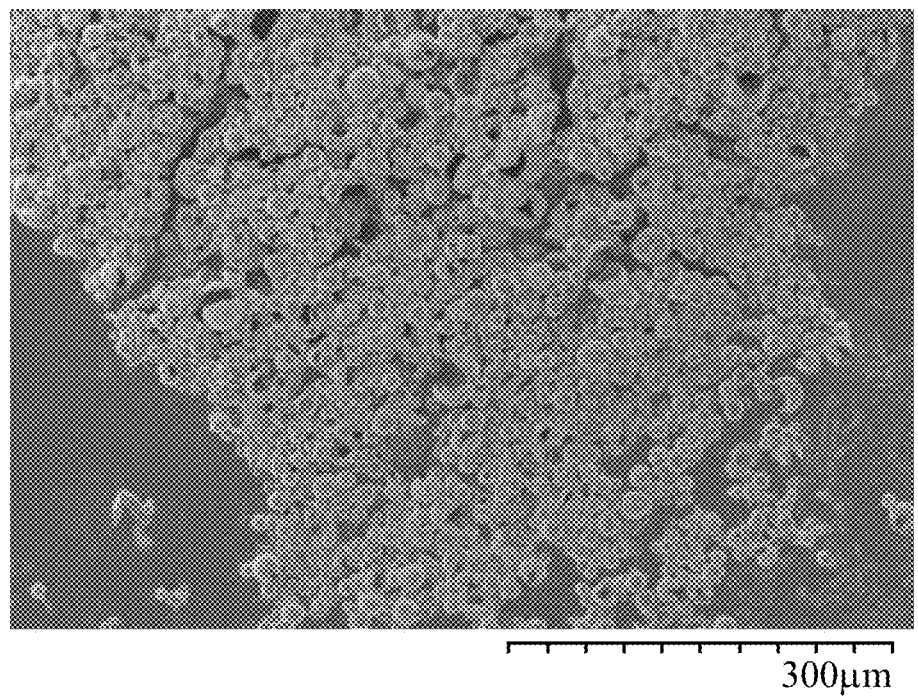
FIG. 10 is a scanning electron microscopy image of capsules of Example 4 in accordance with embodiments of the disclosure.
Figure 11:
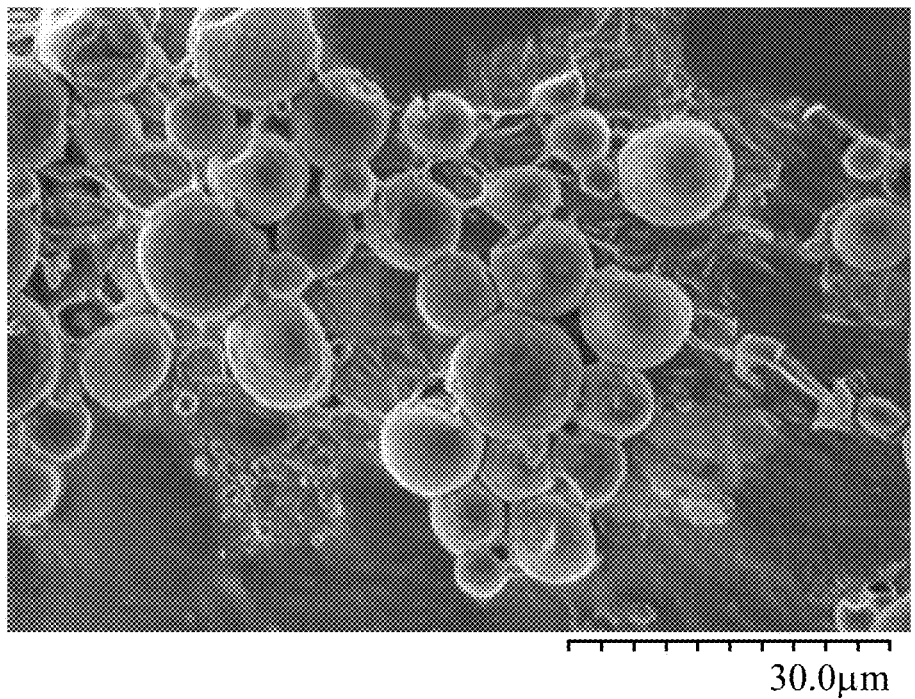
FIG. 11 is a scanning electron microscopy image of capsules of Example 4 in accordance with embodiments of the disclosure.
Figure 12:
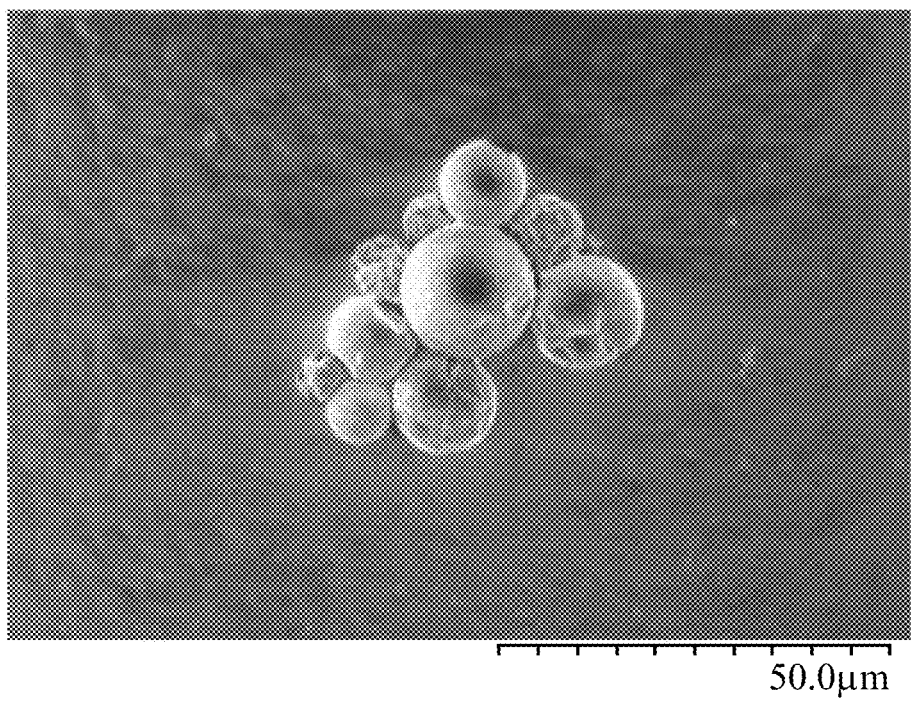
FIG. 12 is a scanning electron microscopy image of capsules of Example 4 in accordance with embodiments of the disclosure.
Figure 13:
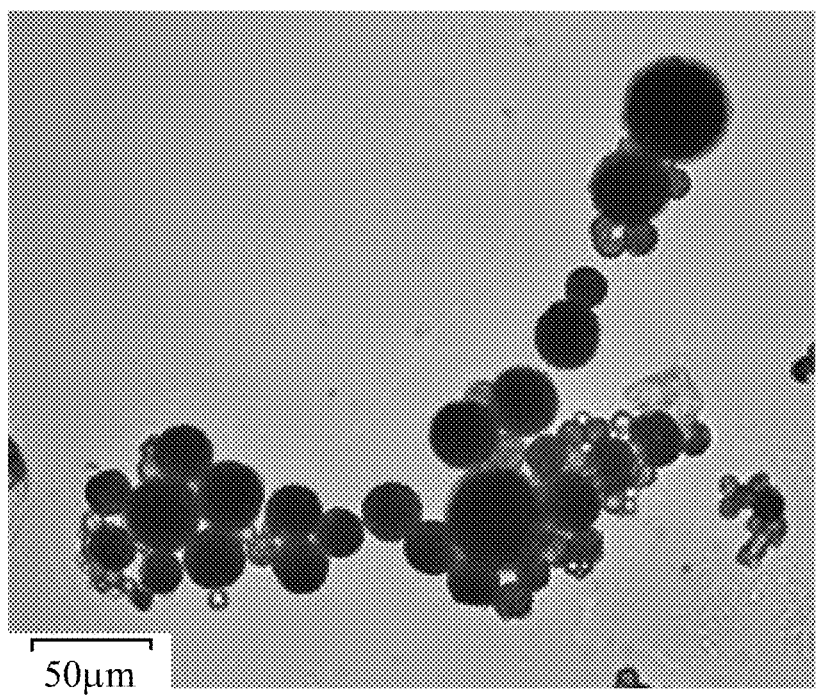
FIG. 13 is an optical microscopy image of capsules of Example 4 in accordance with embodiments of the disclosure.
Figure 14:
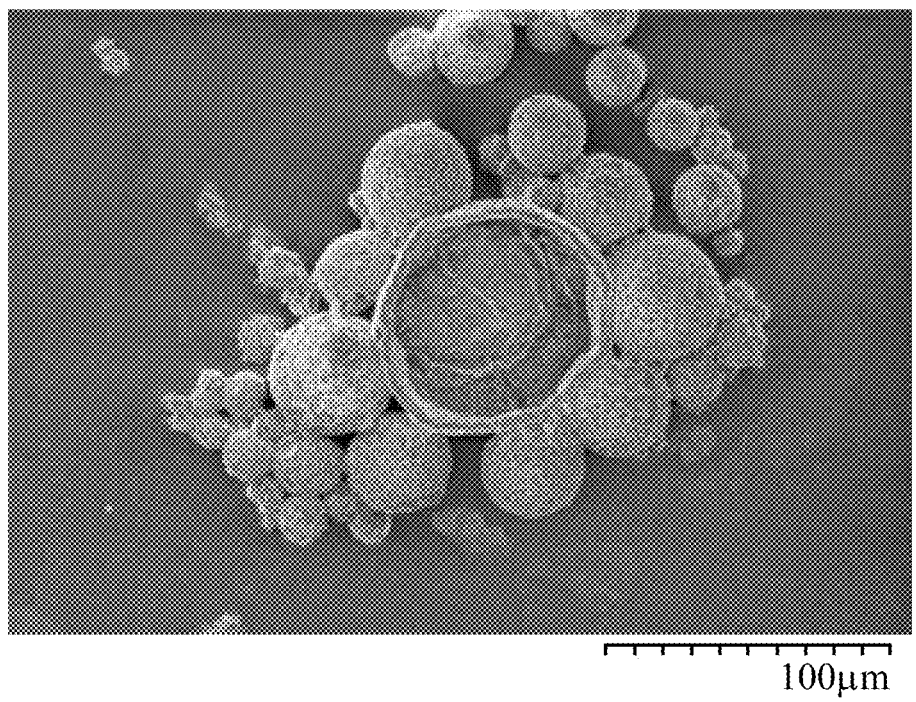
FIG. 14 is a scanning electron microscopy image of capsules of Example 4 in accordance with embodiments of the disclosure.
Figure 15:
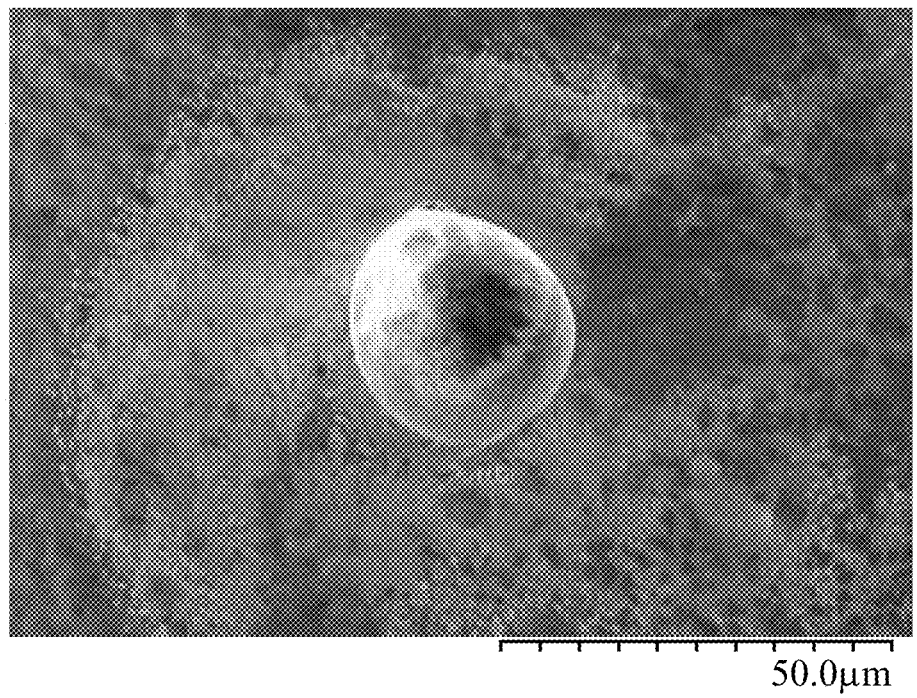
FIG. 15 is a scanning electron microscopy image of capsules of Example 4 in accordance with embodiments of the disclosure.
Figure 16:
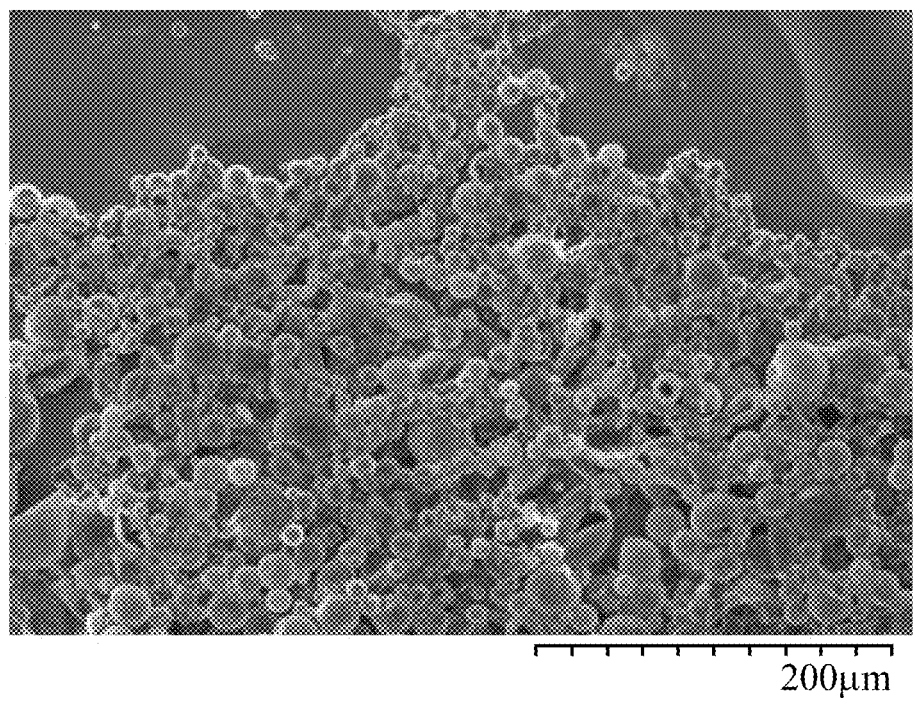
FIG. 16 is a scanning electron microscopy image of capsules of Example 4 in accordance with embodiments of the disclosure.
Figure 17:
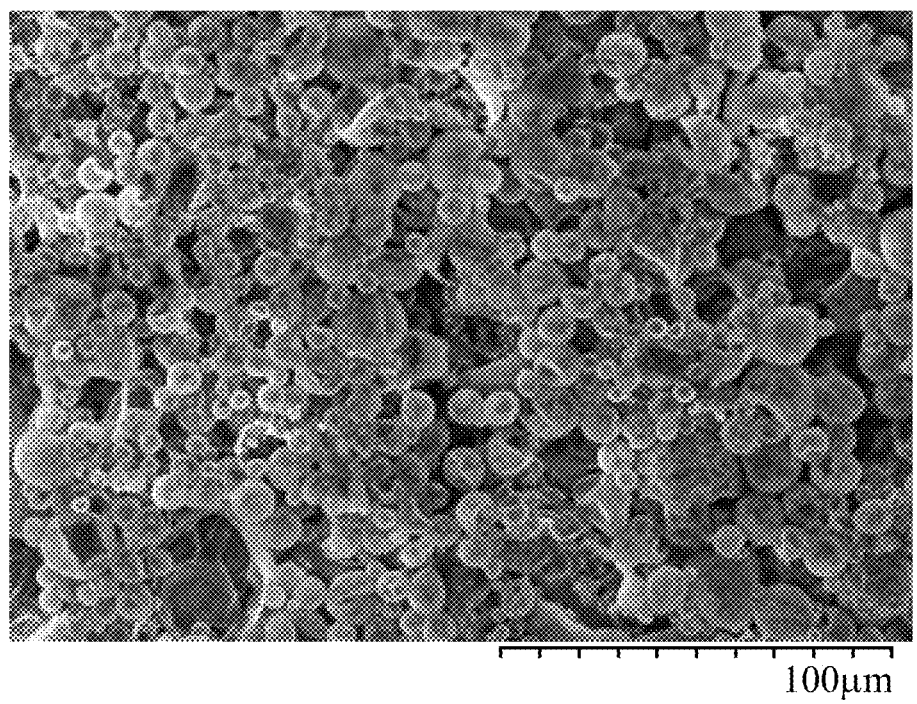
FIG. 17 is a scanning electron microscopy image of capsules of Example 4 in accordance with embodiments of the disclosure.
Figure 18:
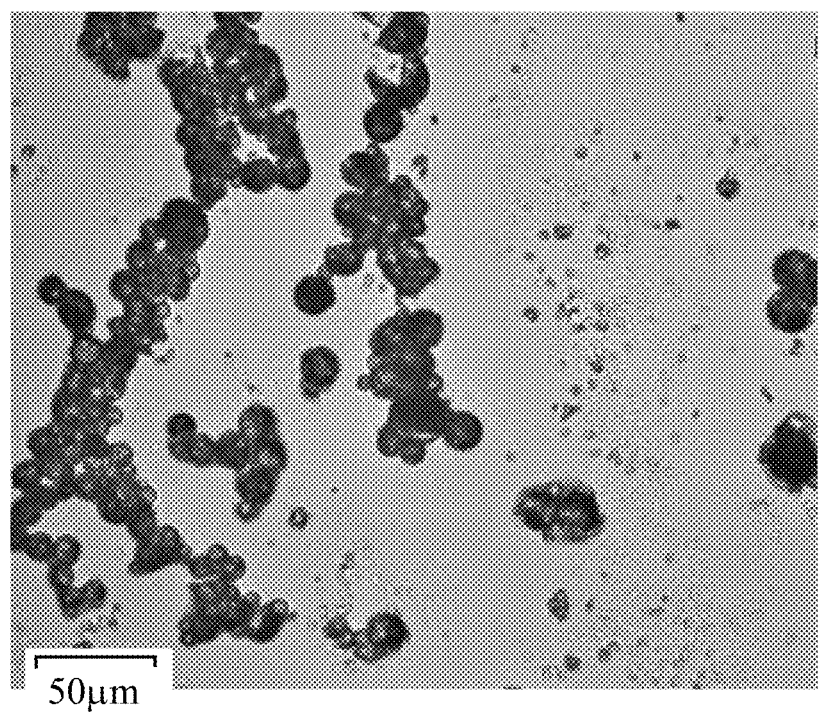
FIG. 18 is an optical microscopy image of capsules of Example 4 in accordance with embodiments of the disclosure.
Figure 19:
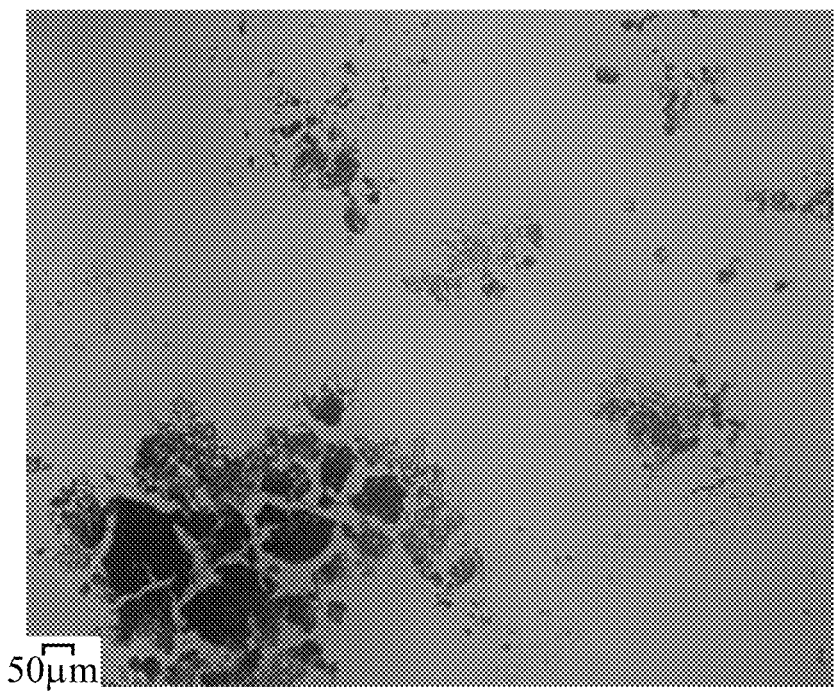
FIG. 19 is an optical microscopy image of capsules of Example 4 in accordance with embodiments of the disclosure.

FIGS. 6A and 6B illustrate collapsed capsules of Sample U, of table 6. FIG. 7 illustrates capsules of Sample V, of the table 6. FIG. 8 illustrate capsules of the Sample W, of the table 6. FIG. 9 illustrate capsules of Samples X, of the table 6. FIG. 10 illustrate capsules of samples Y, of the table 6. FIG. 11 illustrate capsules of sample Z, of the table 6. FIG. 12 illustrate capsules of sample AA, of the table 6. FIG. 13 illustrate capsules from sample AB, of the table 6. FIG. 14 illustrate capsules from sample AC, of the table 6. FIG. 15 illustrate capsules from sample AD, of the table 6. FIG. 16 illustrate capsules from sample AE, of the table 6. FIG. 17 illustrate capsules from sample AF, of the table 6. FIG. 18 illustrate capsules from sample AG, of the table 6. FIG. 19 illustrate capsules from sample AH, of the table 6.

TABLE 5

Capsule making

| Sample ID | Emulsion | Precursor type (ID from Tables 1-4) | Sample ID | Emulsion | Precursor type (ID from Tables 1-4) |
|---|---|---|---|---|---|
| E | Oil in water | G | L | Oil in water | AAL |
| F | Oil in water | AAH | M | Oil in water | AAM |
| G | Oil in water | AAG | N | Oil in water | AAN |
| H | Oil in water | AAI | O | Oil in water | O |
| I | Oil in water | AAJ | P | Oil in water | P |
| J | Oil in water | AAF | Q | Oil in water | R |
| K | Oil in water | AAK | R | Oil in water | TEOS* |

*Not included in tables 1-4. Raw material from Sigma Aldric (CAS number: 78-10-4).

TABLE 6

Examples results

| Sample ID | Mean Diameter (um) | CoV PSD (%) | Shell % inorganic | Survive drying |
|---|---|---|---|---|
| U | 8.1 | 41.3 | 100% | No |
| V | 23.2 | 59.5 | 100% | Yes |
| W | 20.8 | 74.8 | 100% | Yes |
| X | 33.2 | 51.0 | 100% | Yes |
| Y | 15.4 | 52.7 | 100% | Yes |
| Z | 25.8 | 59.3 | 100% | Yes |
| AA | 18.4 | 81.1 | 100% | Yes |
| AB | 22.9 | 60.2 | 100% | Yes |
| AC | 20.2 | 66.1 | 100% | Yes |
| AD | 20.5 | 52.6 | 100% | Yes |
| AE | 36.7 | 50.8 | 98% | Yes |
| AF | 20.0 | 50.0 | 94% | Yes |
| AG | 14.7 | 54.2 | 99% | Yes |
| AH | 14.3 | 61.2 | 100% | No |

TABLE 7

Concordance between Example 4 & Example 5

| Sample ID Example 4 | Sample ID Example 5 |
|---|---|
| E | U |
| F | V |
| G | W |
| H | X |
| I | Y |
| J | Z |
| K | AA |
| L | AB |
| M | AC |
| N | AD |
| O | AE |
| P | AF |
| Q | AG |
| R | AH |

For all examples below, the following method was used to test if capsules collapse: 0.1 gr of slurry was diluted into 5 gr of DI water. Of this dilution, a few drops were added onto a microslide, and the capsules were let air drying until all water had evaporated. When observing the dry slurry with an optical microscope, one could then determine if capsules were not collapsing if they maintain their initial spherical shape.

The below comparative Examples 1 to 4 show the importance of using precursors as disclosed in this invention in combination with a second shell component. as disclosed in this invention to obtain capsules with low permeabilities upon drying on substrate.

Comparative Example 1

The water phase was prepared by diluting a 25 w % CTAC (aq.) solution (supplied by Sigma Aldrich) into DI water, to reach a concentration of 0.52 w % of CTAC.

The oil phase was made by mixing 40 gr of Fragrance of formula (A) and 10 gr of TEOS. The above oil phase was mixed with 100 gr of the above water phase using an ultraturrax mixer (S25N mixing tool from IKA), at 8500 rpm for 1 minute. The resulting emulsions pH was trimmed to 3.9 with the use of 1M NaOH (supplied by sigma Aldrich). Then, the emulsion was continuously stirred at 160 rpm with an overhead mixer and heated at 30 C for 17 hours in a jacketed reactor that was covered to avoid evaporation of water or any other components. After the 17-hour reaction time, capsules had formed.

Comparative Example 2

Same as comparative example 1, except that after the capsule slurry was formed, the pH was trimmed to 3.2 and 5.7 g of TEOS was added dropwise over 320 minutes while the temperature was maintained at 30 C and mixing speed at 160 rpm with an overhead mixer. After all the TEOS was added, the slurry was mixed for an additional 18 hours at 30 C and 160 rpm with an overhead mixer, to obtain capsules.

Fragrance Formula (A):

Hexyl acetate 9 w %
Methyl dihydrojasmonate 9 w %
Tetrahydrolinalol 9 w %
α-Ionone 9 w %
Lilial 18 w %
Hexylcinnamyl aldehyde 18 w %
Hexyl salicylate 18 w %
Verdyl Acetate 10 w %

Comparative Example 3

144 gr of the same fragrance as for example 3-5 was weighed in a vessel. In a separate vessel, 96 gr of a 1 w % CTAC solution was created by mixing 3.84 gr of a 25 w % CTAC solution and bringing the mass to 96 gr with DI water. The above fragrance was mixed with the above surfactant mixture with an IKA ultraturrax mixer (S25N mixing tool) at 8000 rpm for 5 minutes.

Next, 144 gr of water with a pH of 3.8 (trimmed with Concentrated HCl) was added to the above prepared emulsion system.

Next, 27 gr of a mixture containing 26.73 gr of TEOS and 0.27 gr of DimethylDiethoxysilane was added dropwise to the emulsion system under constant mixing. When all of the precursor was added, the mixture was heated to 50 C and stirred at 200 rpm with an overhead mixer in a jacketed reactor for 2 hours.

Comparative Example 4

The oil phase was prepared by mixing 20 gr of TEOS, 78 gr of Isopropyl Myristate and 52 gr of the same fragrance as used in example 3.

Next, the water phase was prepared by weighing 10 gr of a 25 w % CTAC (aq.) solution and bringing the weight to 150 gr with DI water to reach a CTAC concentration of 1.67 w %.

The two phases were mixed together with a Ultraturrax mixer (S25N tool from IKA) at 6000 rpm for 1 minute. Next, 50 g of Ludox TM50 was added and the system was further mixed at 8000 rpm for another 1 minute. Next, the pH was adjusted to 5 with 1M HCl.

To the above mixture, 50 gr of 10 w % PVOH in water (selvol 540) and 5 gr of a 25 w % sodium silicate in water were added. The pH was then readjusted to 4, and the system stirred at Room temperature at 200 rpm with an overhead mixer for 20 hours.

Example 6

Figure 20:
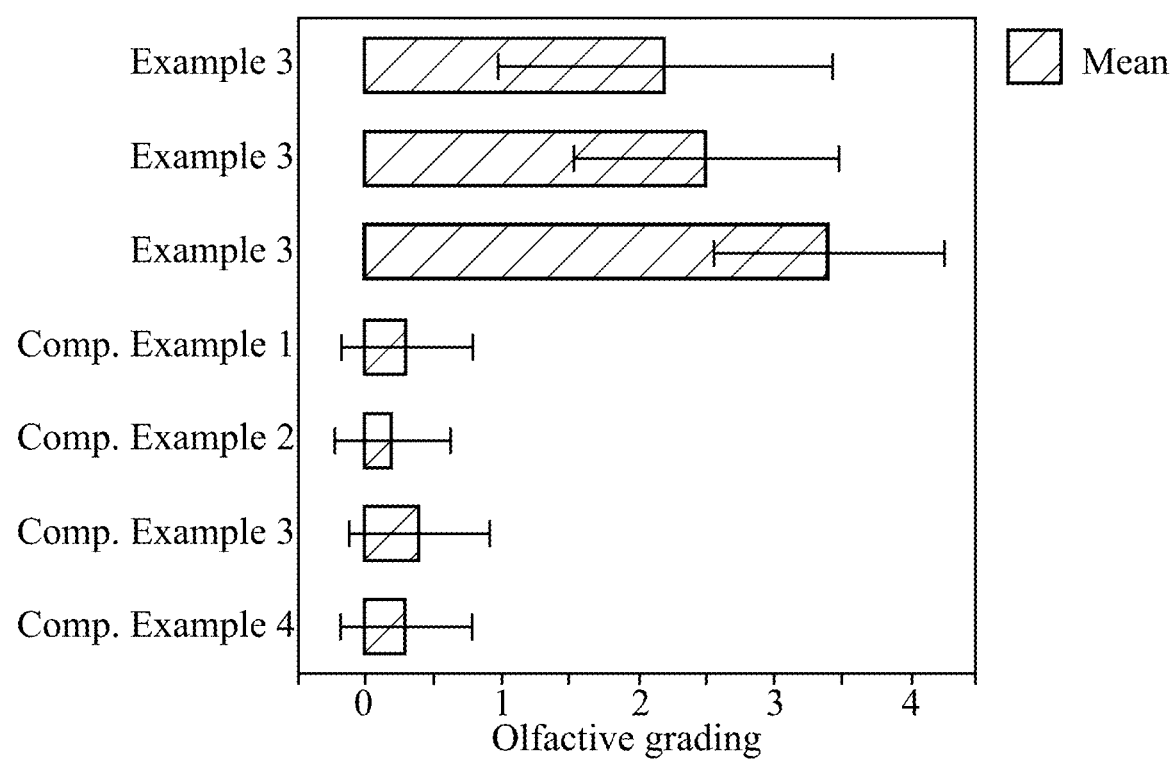
FIG. 20 is bar chart representation of the oil retention test results of capsules of Examples 3-5 in accordance with embodiments of the disclosure and capsules of comparative examples 1-4.

The shell permeability upon drying on a substrate for the capsules according to the present disclosure (example 3-5) were assessed using the core retention test and compared with the comparative examples 1-4. The mean olfactive gradings are represented on Table 8 and FIG. 20. As shown on Table 3, capsules of the present disclosure have a significantly higher mean olfactive gradings compared to the capsules of the comparative examples, indicating a lower shell permeability upon drying on substrate.

TABLE 8

| Capsules | Connecting Letters | Mean olfactive grading |
|---|---|---|
| Example 3 | A | 2.2 |
| Example 4 | A | 2.5 |
| Example 5 | B | 3.4 |
| Comp. Example 1 | C | 0.3 |
| Comp. Example 2 | C | 0.2 |

TABLE 8-continued

| Capsules | Connecting Letters | Mean olfactive grading |
|---|---|---|
| Comp. Example 3 | C | 0.4 |
| Comp. Example 4 | C | 0.3 |

Levels not connected by same letter are significantly different (alpha = 0.05, student's t-test).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A population of capsules, the capsules comprising:
an oil-based core comprising a benefit agent; and
a substantially inorganic shell surrounding the core, the shell comprising:
a first shell component comprising:
a condensed layer comprising a condensation product of a precursor, and
wherein the precursor comprises at least one compound of Formula (I)

$$(M^vO_zY_n)_w \quad \text{(Formula I)}$$

where M is one or more of silicon, titanium and aluminum,
v is the valence number of M and is 3 or 4,
z is from 0.5 to 1.6
each Y is independently selected from —OH, —OR², halo,

—NH₂, —NHR², —N(R²)₂, and

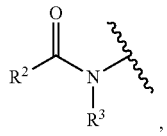

wherein R² is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S,
R³ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S,
n is from 0.7 to (v-1), and
w is from 2 to 2000;
wherein the substantially inorganic shell comprises up to 1% organic content; and
wherein the shell comprises an organic emulsifier.

2. The capsules according to claim 1, wherein an inorganic second shell component surrounds the first shell component.

3. The capsules according to claim 2, where the inorganic second shell component comprises at least one of $SiO_2$ or $CaCO_3$.

4. The capsules according to claim 1, wherein the capsules have a mean volume weighted capsule diameter of about 0.1 μm to about 200 μm.

5. The capsules according to claim 1, wherein the organic emulsifier is at least one of an organic surfactant or an organic polymeric emulsifier.

6. The capsules according to claim 5, wherein the organic emulsifier is an organic polymeric emulsifier.

7. The capsules according to claim 6, wherein organic polymeric emulsifier is at least one of polymers containing carboxylic acid groups, copolymers of vinyl and carboxylic acid groups, polymers containing quaternized ammonium salt groups, polymers containing nitrogen-based cationic groups, polysaccharides, anionically modified polysaccharides, or cationically modified polysaccharides.

8. The capsules according to claim 6, wherein the organic polymeric emulsifier is at least one of polyvinyl alcohol, copolymer of vinyl alcohol and vinyl acetate, polyethylene glycol, copolymer of ethylene oxide and propylene oxide, copolymers of ethylene and maleic anhydride, copolymer of butene and maleic anhydride, copolymer of styrene and maleic anhydride, Tween 20, Tween 80, Chitosan, Gelatin, Gum Arabic, Polyethylene imine, or polyvinyl pyrrolidone.

9. The capsules according to claim 8, wherein the organic polymeric emulsifier is at least one of polyvinyl alcohol or copolymers of ethylene and maleic anhydride.

10. The capsules according to claim 5, wherein the organic surfactant is at least one of anionic surfactant, cationic surfactant, non-ionic surfactant or amphoteric surfactant.

11. The capsules according to claim 10, wherein the anionic surfactant is at least one of alkyl sulfates, alkyl sulfonates, alkyl phosphates, alkyl carboxylates, alkyl ethoxylated sulfates, alkyl ethoxylated sulfonates, alkyl ethoxylated phosphates, or alkyl ethoxylated carboxylates.

12. The capsules according to claim 10, wherein the cationic surfactant is at least one of alkyl ammonium salts or alkyl amines.

13. The capsules according to claim 10, wherein the non-ionic surfactant is at least one of alkyl ethoxylates, alkyl phenol ethoxylates, alkyl polyglucosides, alkyl polysorbates, sorbitan esters, or glycerol esters.

14. The capsules according to claim 10, wherein the amphoteric surfactant is at least one of amine oxides or amine betaines.

15. The capsules according to claim 5, wherein the organic surfactant is at least one of sodium dodecyl sulfates, Triton X, Span 20, Span 80, cetyl trimethylammonium chloride, or cocamido propyl betaine.

16. The capsules according to claim 1, wherein the benefit agent comprises at least one of chromogens and dyes, perfume compositions, perfume raw materials, lubricants, silicone oils, waxes, hydrocarbons, higher fatty acids, essential oils, lipids, skin coolants, vitamins, sunscreens, antioxidants, catalysts, malodor reducing agents, odor-controlling materials, softening agents, insect and moth repelling agents, colorants, pigments, pharmaceuticals, pharmaceutical oils, adhesives, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, color maintenance agents, color restoration/rejuvenation agents, anti-fading agents, anti-abrasion agents, wear resistance agents, fabric integrity agents, anti-wear agents, anti-pilling agents, defoamers, anti-foaming agents, UV protection agents, sun fade inhibitors, anti-allergenic agents, fabric comfort agents, shrinkage resistance agents, stretch resistance agents, stretch recovery agents, skin care agents and natural actives, dyes, phase change materials, fertilizers, nutrients, or herbicides.

17. The capsules according to claim 16, wherein the benefit agent comprises a perfume composition.

18. The capsules according to claim 1, where the benefit agent containing core further comprises a core modifier.

19. The capsules according to claim 2, where the inorganic second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, or clay.

* * * * *